US011543962B2

(12) United States Patent
McIntosh et al.

(10) Patent No.: US 11,543,962 B2
(45) Date of Patent: Jan. 3, 2023

(54) METHODS AND SYSTEMS FOR GENERATING ANIMATED IMAGES FOR PRESENTATION BY A DYNAMIC KEYBOARD INTERFACE

(71) Applicant: Google LLC, Mountain View, CA (US)

(72) Inventors: David McIntosh, San Francisco, CA (US); Peter Chi Hao Huang, Pacifica, CA (US); Erick Hachenburg, San Francisco, CA (US); David Lindsay Bowen, San Francisco, CA (US); Joseph Lieu, San Francisco, CA (US); Kira Lee Psomas, Berkeley, CA (US); Jason R. Krebs, New York, NY (US); Kumar Garapaty, San Francisco, CA (US); Samantha Janelle Jiwei Lau, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 120 days.

(21) Appl. No.: 17/272,514

(22) PCT Filed: Aug. 20, 2019

(86) PCT No.: PCT/US2019/047248
§ 371 (c)(1),
(2) Date: Mar. 1, 2021

(87) PCT Pub. No.: WO2020/046644
PCT Pub. Date: Mar. 5, 2020

(65) Prior Publication Data
US 2021/0333992 A1    Oct. 28, 2021

Related U.S. Application Data

(60) Provisional application No. 62/725,676, filed on Aug. 31, 2018.

(51) Int. Cl.
*G06F 16/532* (2019.01)
*G06F 3/04886* (2022.01)
(Continued)

(52) U.S. Cl.
CPC ........ *G06F 3/04886* (2013.01); *G06F 3/0482* (2013.01); *G06F 16/532* (2019.01);
(Continued)

(58) Field of Classification Search
CPC .. G06F 3/04886; G06F 3/0482; G06F 16/532; G06F 3/0236; G06N 20/00;
(Continued)

(56) References Cited

U.S. PATENT DOCUMENTS

2010/0241663 A1    9/2010   Huang et al.
2015/0286371 A1    10/2015  Degani
2018/0039406 A1    2/2018   Kong et al.

FOREIGN PATENT DOCUMENTS

JP    2013/527547    6/2013
JP    2016/012196    1/2016
JP    2016/157468    9/2016

OTHER PUBLICATIONS

International Preliminary Report on Patentability for PCT/US2019/047248, dated Mar. 2, 2021, 8 pages.
(Continued)

*Primary Examiner* — Andrey Belousov
(74) *Attorney, Agent, or Firm* — Dority & Manning, P.A.

(57) ABSTRACT

The present disclosure is directed to generating animated images for presentation by a dynamic keyboard interface. In particular, the methods and systems of the present disclosure can: receive data describing advertisement content, and data describing a first context in which to present the advertisement content; generate data describing a first animated image including at least a portion of the advertisement
(Continued)

content; determine a second context in which to present the advertisement content; generate data describing a second animated image including at least a portion of the advertisement content; and communicate, to one or more user devices on which one or more applications are executed, data indicating a plurality of different animated images for presentation by a dynamic keyboard interface in association with the one or more applications, the plurality of different animated images comprising the first animated image and the second animated image.

20 Claims, 29 Drawing Sheets

(51) Int. Cl.
| | |
|---|---|
| *G06N 20/00* | (2019.01) |
| *G06F 3/0482* | (2013.01) |
| *G06Q 30/02* | (2012.01) |
| *G06T 13/80* | (2011.01) |
| *G06V 10/70* | (2022.01) |
| *H04L 51/04* | (2022.01) |
| *H04L 51/10* | (2022.01) |
| *G06V 30/10* | (2022.01) |

(52) U.S. Cl.
CPC .......... *G06N 20/00* (2019.01); *G06Q 30/0245* (2013.01); *G06Q 30/0251* (2013.01); *G06Q 30/0267* (2013.01); *G06Q 30/0277* (2013.01); *G06T 13/80* (2013.01); *G06V 10/768* (2022.01); *G06V 30/10* (2022.01); *H04L 51/04* (2013.01); *H04L 51/10* (2013.01)

(58) Field of Classification Search
CPC .......... G06Q 30/0245; G06Q 30/0251; G06Q 30/0267; G06Q 30/0277; G06Q 30/02; G06Q 30/0241; G06T 13/80; G06V 10/768; G06V 30/10; H04L 51/04; H04L 51/10; H04M 1/7243
See application file for complete search history.

(56) References Cited

OTHER PUBLICATIONS

International Search Report for PCT/US2019/047248, dated Nov. 27, 2019, 2 pages.

METHODS AND SYSTEMS FOR GENERATING ANIMATED IMAGES FOR PRESENTATION BY A DYNAMIC KEYBOARD INTERFACE

PRIORITY CLAIM

This application is based upon and claims the right of priority under 35 U.S.C. § 371 to International Application No. PCT/US2019/047248 filed on Aug. 20, 2019, which claims the benefit of U.S. Provisional Application Ser. No. 62/725,676 filed Aug. 31, 2018. Applicant claims priority to and the benefit of each of such applications and incorporates all such applications herein by reference in their entirety.

FIELD

The present disclosure relates generally to animated images. More particularly, the present disclosure relates to generating animated images for presentation by a dynamic keyboard interface.

BACKGROUND

Computing devices (e.g., desktop computers, laptop computers, tablet computers, smartphones, wearable computing devices, and/or the like) are ubiquitous in modern society. They can support communications between their users, provide their users with information about their environments, current events, the world at large, and/or the like. A myriad of different types of interfaces enable users to interact with such devices. For example, many devices include a touchscreen and provide an interface (e.g., including user-selectable options, a keyboard, and/or the like) configured to enable users to input information. Animated images (e.g., graphics interchange format (GIF) images, and/or the like) can include data describing a series of ordered image frames that when rendered produce a moving image, and/or the like. Animated images can be utilized to express, convey, communicate, and/or the like thoughts, feelings, concepts, emotions, and/or the like.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include receiving, by one or more computing devices: data describing advertisement content, and data describing a first context in which to present the advertisement content. The method can also include generating, by the computing device(s) and based at least in part on the data describing the advertisement content, data describing a first animated image including at least a portion of the advertisement content. The method can further include determining, by the computing device(s) and based at least in part on the data describing the first context in which to present the advertisement content, a second context in which to present the advertisement content. The second context can be different and distinct from the first context. The method can further include generating, by the computing device(s) and based at least in part on the data describing the advertisement content and the second context in which to present the advertisement content, data describing a second animated image including at least a portion of the advertisement content. The second animated image can be visually distinguishable from the first animated image. The method can further include communicating, by the computing device(s) and to one or more user devices on which one or more applications are executed, data indicating a plurality of different animated images for presentation by a dynamic keyboard interface in association with the application(s). The plurality of different animated images can include the first animated image and the second animated image.

Another example aspect of the present disclosure is directed to a system. The system can include one or more processors and a memory storing instructions that when executed by the processor(s) cause the system to perform operations. The operations can include receiving data indicating a selection, from amongst a plurality of different animated images presented, by a dynamic keyboard interface, in association with a first context for presenting advertisement content, of a first animated image comprising at least a portion of the advertisement content. The operations can also include receiving data indicating a selection, from amongst a plurality of different animated images presented, by the dynamic keyboard interface, in association with a context different and distinct from the first context, of an animated image that does not comprise the advertisement content. The operations can further include determining, based at least in part on the data indicating the selection of the first animated image comprising the at least a portion of the advertisement content and the data indicating the selection of the animated image that does not comprise the advertisement content, a second context for presenting the advertisement content. The second context can be different and distinct from the first context. The operations can further include generating, based at least in part on the second context for presenting the advertisement content and data describing the advertisement content, a second animated image comprising at least a portion of the advertisement content. The second animated image can be visually distinguishable from the first animated image.

A further example aspect of the present disclosure is directed to one or more non-transitory computer-readable media. The non-transitory computer-readable media can comprise instructions that when executed by one or more computing devices cause the computing device(s) to perform operations. The operations can include receiving data describing advertisement content. The operations can also include receiving data indicating a selection, from amongst a plurality of different animated images presented, by a dynamic keyboard interface, in association with a first context for presenting the advertisement content, of a first animated image comprising at least a portion of the advertisement content. The operations can further include generating, based at least in part on the data describing the advertisement content and data indicating a context different and distinct from the first context for presenting the advertisement content, a second animated image comprising at least a portion of the advertisement content for presentation by the dynamic keyboard interface in association with a second context for presenting the advertisement content determined by the computing device(s) based at least in part on the data indicating the selection of the first animated image and the data indicating the context different and distinct from the first context. The second context can be different and distinct from the first context. The second animated image can be visually distinguishable from the first animated image.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
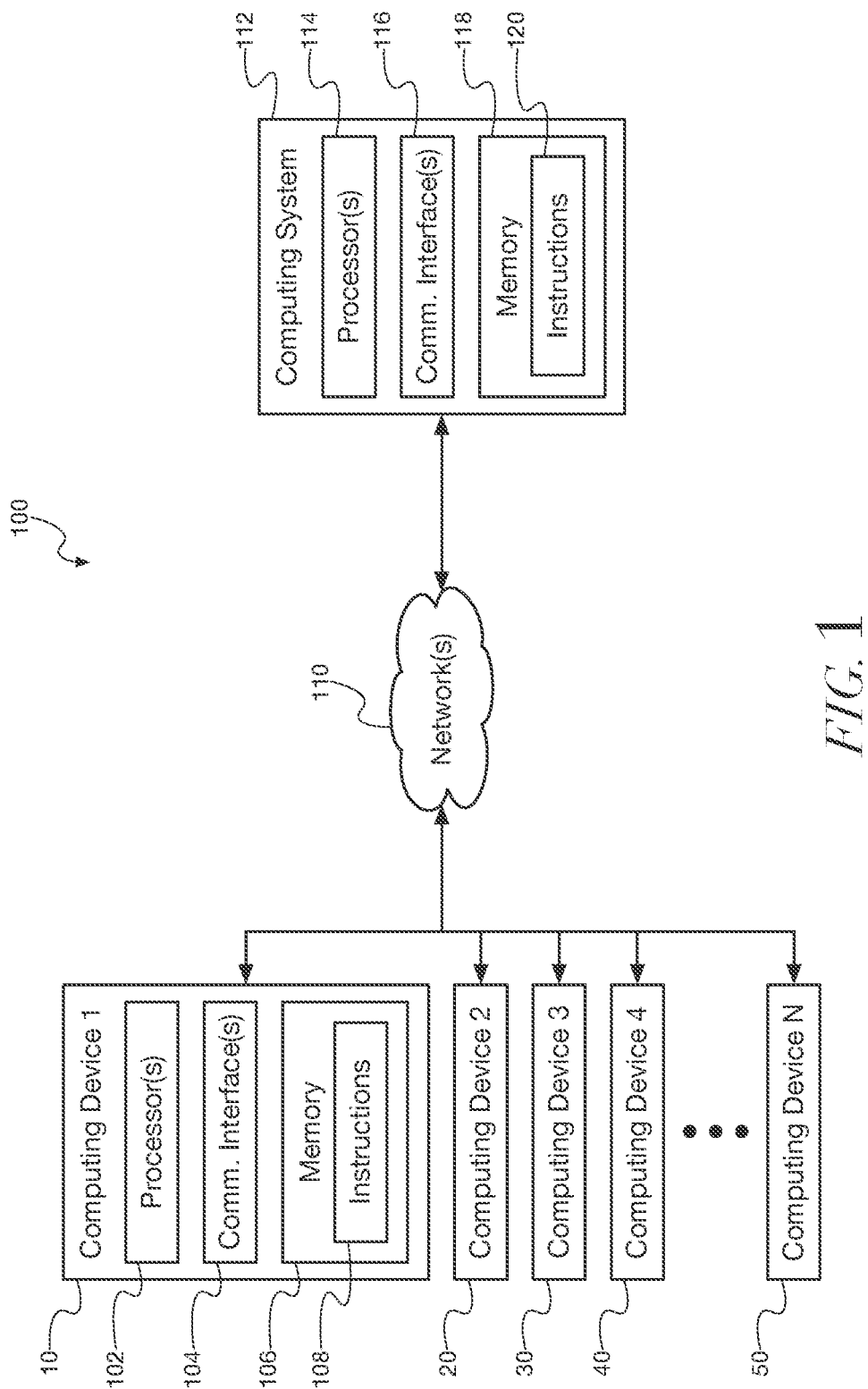
FIG. 1 depicts an example computing environment according to example embodiments of the present disclosure.

Example aspects of the present disclosure are directed to generating animated images for presentation by a dynamic keyboard interface. In particular, a computing system (e.g., one or more computing devices, and/or the like) can receive data describing advertisement content and a context in which to present the advertisement content, determine a different and distinct context in which the present the advertisement content, and generate data describing one or more animated images comprising one or more portions of the advertisement content for presentation by a dynamic keyboard interface in association with the context, the different and distinct context, and/or the like.

For example, a dynamic keyboard interface (e.g., for use via a touchscreen, and/or the like) can be provided (e.g., as part of an operating system (OS), third-party application, plugin, and/or the like) to one or more user devices (e.g., computers, smartphones, tablet computing devices, wearable computing devices, and/or the like). One or more aspects of the dynamic keyboard interface can be configured to provide access (e.g., via search functionality, suggestion functionality, browsing functionality, and/or the like) to a corpus of animated images (e.g., graphics interchange format (GIF) images, and/or the like), for example, uploaded to, stored by, indexed by, managed by, and/or the like a remotely located computing system (e.g., one or more computing devices, and/or the like).

One or more records regarding such corpus can include data describing one or more animated images comprising advertisement content (e.g., for one or more products, services, media content items, and/or the like), indicating one or more contexts in which to present such animated image(s), and/or the like. For example, the computing system can receive (e.g., via one or more networks, and/or the like) data describing advertisement content (e.g., for a particular brand of coffee, and/or the like), one or more contexts (e.g., coffee generally, geographic locations at which the particular brand of coffee is available, and/or the like) in which to present the advertisement content, and/or the like. For example, such data can be received from one or more computing devices associated with an entity that is the subject of, creates, maintains, coordinates, manages, and/or the like such advertisement content.

Based at least in part on such data, the computing system can generate data describing one or more animated images comprising one or more portions of the advertisement content. For example, the data describing the advertisement content can describe one or more animated images, other imagery, text, and/or the like, and the computing system can generate, based at least in part on such data, the data describing the animated image(s) for presentation by the dynamic keyboard interface, and such data can be stored as part of one or more records regarding the corpus, along with data indicating the context(s) in which to present such animated image(s), and/or the like.

A user (e.g., utilizing a user device providing the dynamic keyboard interface, and/or the like) can perform one or more actions that provide one or more contexts, for example, of the user device, the dynamic keyboard interface, an application (e.g., a messaging application, and/or the like) in association with which the dynamic keyboard interface is provided, and/or the like. For example, the user can locate the user device at a particular geographic location, input one or more search terms via the dynamic keyboard interface, interact with the application via its interface, and/or the like. Data indicating the context(s) can be generated (e.g., by the user device, the dynamic keyboard interface, and/or the like), communicated to the computing system (e.g., via the network(s), and/or the like), and received by the computing system, which can update one or more records regarding the corpus of animated images based at least in part on such data.

Based at least in part on the data indicating the context(s), the record(s) regarding the corpus of animated images, and/or the like, the computing system can identify a plurality of different animated images associated with the context(s) for presentation by the dynamic keyboard interface in association with the application (e.g., animated images relevant, responsive, and/or the like to the context(s)).

In some embodiments, one or more of the plurality of different animated images associated with the context(s) can include one or more of the animated image(s) comprising the portion(s) of the advertisement content. For example, the data indicating the context(s) can indicate a context in which to present the advertisement content (e.g., a current geographic location of the user device corresponding to a geographic location at which the particular brand of coffee is available, and/or the like), and based at least in part on such data, the record(s) regarding the corpus of animated images, and/or the like, the computing system can identify one or more of the animated image(s) comprising the portion(s) of the advertisement content, for example, an animated image advertising the particular brand of coffee, comprising data (e.g., a link, and/or the like) configured to cause an application executed by the user device (e.g., a web browser, an application associated with the particular brand of coffee, and/or the like) to present, navigate to, and/or the like content associated with the particular brand of coffee, and/or the like.

Additionally or alternatively, one or more of the plurality of different animated images associated with the context(s) can include one or more animated images that do not include the advertisement content. For example, the data indicating the context(s) can indicate one or more contexts (e.g., books, and/or the like) different and distinct from the context(s) in which to present the animated image(s) comprising the portion(s) of the advertisement content, and based at least in part on such data, the record(s) regarding the corpus of animated images, and/or the like, the computing system can identify one or more animated images (e.g., an animated image of a book, and/or the like) determined by the computing system to be associated with such different and distinct context(s), and/or the like.

Data indicating the plurality of different animated images associated with the context(s), can be generated (e.g., by the computing system, and/or the like) and communicated (e.g., via the network(s), and/or the like) to the dynamic keyboard interface (e.g., the user device, and/or the like), which can present the plurality of different animated images associated with the context(s) in association with the application, and/or the like. For example, the plurality of different animated images associated with the context(s) can be presented in an ordered, sorted, and/or the like fashion (e.g., animated images determined to be more relevant, responsive, and/or the like to the context(s) can be presented earlier, more prominently, and/or the like).

A user can select one or more particular animated images (e.g., the animated image advertising the particular brand of coffee, the animated image of the book, and/or the like) from amongst the plurality of different animated images associated with the context(s) via the dynamic keyboard interface. For example, the user can select one or more of the particular animated image(s) for communication (e.g., input, pasting, and/or the like) by the dynamic keyboard interface to the application. Additionally or alternatively, the user can select one or more of the particular animated image(s) for future accessibility within the dynamic keyboard interface (e.g., designate such particular animated image(s) for frequent use, "favorite" them, and/or the like).

Data indicating the selection, selection type (e.g., for communication to the application, for future accessibility, and/or the like), particular animated image(s) selected, and/or the like can be generated (e.g., by the user device, the dynamic keyboard interface, and/or the like), communicated to the computing system (e.g., via the network(s), and/or the like), and received by the computing system, which can update the record(s) regarding the corpus of animated images based at least in part on such data.

In some embodiments, a user (e.g., utilizing the user device providing the dynamic keyboard interface, a different and distinct user device providing the dynamic keyboard interface, and/or the like) can perform one or more actions that provide one or more subsequent contexts, for example, of such user device, the dynamic keyboard interface, the application (e.g., the messaging application, and/or the like) in association with which the dynamic keyboard interface is provided, a different and distinct application (e.g., an email application, and/or the like) in association with which the dynamic keyboard interface is provided, and/or the like. For example, the user can locate such user device at a particular geographic location, the user can input one or more search terms via the dynamic keyboard interface, interact with such application(s) via their respective interface(s), and/or the like. Data indicating the subsequent context(s) can be generated (e.g., by the user device, the different and distinct user device, the dynamic keyboard interface, and/or the like), communicated to the computing system (e.g., via the network(s), and/or the like), and received by the computing system, which can update the record(s) regarding the corpus of animated images based at least in part on such data.

Based at least in part on the data indicating the subsequent context(s), the record(s) regarding the corpus of animated images, and/or the like, the computing system can identify a plurality of different animated images associated with the subsequent context(s) for presentation by the dynamic keyboard interface in association with the application and/or the different and distinct application (e.g., animated images relevant, responsive, and/or the like to the subsequent context(s)). In some embodiments, one or more of the plurality of different animated images associated with the subsequent context(s) can include one or more of the animated image(s) comprising the portion(s) of the advertisement content.

Additionally or alternatively, one or more of the plurality of different animated images associated with the subsequent context(s) can include one or more animated images that do not include the advertisement content. For example, the data indicating the subsequent context(s) can indicate one or more contexts (e.g., study, and/or the like) different and distinct from the context(s) in which to present the animated image(s) comprising the portion(s) of the advertisement content, and based at least in part on such data, the record(s) regarding the corpus of animated images, and/or the like, the computing system can identify one or more animated images (e.g., an animated image regarding study, and/or the like) determined by the computing system to be associated with such different and distinct context(s), and/or the like.

Data indicating the plurality of different animated images associated with the subsequent context(s), can be generated (e.g., by the computing system, and/or the like) and communicated (e.g., via the network(s), and/or the like) to the dynamic keyboard interface (e.g., the user device, and/or the like), which can present the plurality of different animated images associated with the subsequent context(s) in association with the application, and/or the like. For example, the plurality of different animated images associated with the subsequent context(s) can be presented in an ordered, sorted, and/or the like fashion (e.g., animated images determined to be more relevant, responsive, and/or the like to the subsequent context(s) can be presented earlier, more prominently, and/or the like).

A user can select one or more particular animated images (e.g., the animated image regarding study, and/or the like) from amongst the plurality of different animated images associated with the subsequent context(s) via the dynamic keyboard interface, and data indicating the selection, selection type (e.g., for communication to the application, for future accessibility, and/or the like), particular animated image(s) selected, and/or the like can be generated (e.g., by the user device, the dynamic keyboard interface, and/or the like), communicated to the computing system (e.g., via the network(s), and/or the like), and received by the computing system, which can update the record(s) regarding the corpus of animated images based at least in part on such data.

Based at least in part on the data indicating identification, selection, and/or the like of one or more of the animated images presented by the dynamic keyboard interface (e.g., the identification, selection, and/or the like of the animated image advertising the particular brand of coffee, the animated image of the book, the animated image regarding study, and/or the like), the record(s) regarding the corpus of animated images, and/or the like, the computing system can determine one or more additional contexts for presenting the advertisement content (e.g., books, study, and/or the like). In some embodiments, determining the additional context(s) can include associating, based at least in part on the data indicating the context in which to present the advertisement content (e.g., the geographic locations at which the particular brand of coffee is available, and/or the like) and the data indicating the different and distinct context(s) (e.g., books, study, and/or the like), the different and distinct context(s) (e.g., books, study, and/or the like) with the context in which to present the advertisement content (e.g., the geographic locations at which the particular brand of coffee is available, and/or the like).

Based at least in part on the data describing the advertisement content and the determined additional context(s) for presenting the advertisement content, the computing system can generate data describing one or more new animated images, each of which can include one or more portions of the advertisement content, be visually distinguishable from the animated image(s) comprising the portion(s) of the advertisement content described by the data previously generated by the computing system, and/or the like.

In some embodiments, generating the data describing the new animated image(s) can include identifying: imagery determined by the computing system to be associated with the different and distinct context(s) (e.g., imagery included in the animated image of the book, the animated image regarding study, and/or the like); imagery determined by the computing system to be associated with the advertisement content (e.g., imagery included in the animated image(s) comprising the portion(s) of the advertisement content described by the data previously generated by the computing system, described by the previously received data describing the advertisement content, and/or the like); and/or text determined by the computing system to be associated with the advertisement content (e.g., text included in the animated image(s) comprising the portion(s) of the advertisement content described by the data previously generated by the computing system, described by the previously received data describing the advertisement content, and/or the like).

In some embodiments, generating the data describing the new animated image(s) can include augmenting at least a portion of the imagery determined to be associated with the advertisement content (e.g., a background indicating a "BRAND_NAME" of the particular brand of coffee, a logo associated with the particular brand of coffee, a cup having such logo, and/or the like) with visible text (e.g., "GREAT!," "FOR WHEN IT'S," "STUDY TIME," and/or the like) determined by the computing system to be associated with one or more of the different and distinct context(s), associate one or more of the new animated image(s) with one or more of the different and distinct context(s), and/or the like.

In some of such embodiments, the computing system can utilize optical character recognition (OCR) to determine one or more characters (e.g., "STUDY TIME," and/or the like) included in the imagery determined to be associated with the different and distinct context(s) (e.g., the imagery included in the animated image regarding study, and/or the like), generate data describing the visible text based at least in part on such determined character(s), and/or the like. Additionally or alternatively, the received data indicating the different and distinct context(s) can indicate one or more search terms (e.g., "study," and/or the like), data presented by and/or input into one or more applications in association with which the dynamic keyboard interface was provided (e.g., "Great!," and/or the like), and the computing system can generate data describing the visible text based at least in part on such data, and/or the like.

In some embodiments, generating the data describing the new animated image(s) can include augmenting at least a portion of the imagery determined to be associated with the advertisement content (e.g., the background indicating the "BRAND_NAME" of the particular brand of coffee, the logo associated with the particular brand of coffee, the cup having such logo, and/or the like) with at least a portion of the imagery determined to be associated with the different and distinct context(s) (e.g., the imagery included in the animated image of the book, the animated image regarding study, and/or the like). In some of such embodiments, the computing system can determine the at least a portion of the imagery determined to be associated with the different and distinct context(s) is associated with one or more of the different and distinct context(s), associates one or more of the new animated image(s) with one or more of the different and distinct context(s), and/or the like.

In some embodiments, generating the data describing the new animated image(s) can include augmenting at least a portion of the imagery determined to be associated with the different and distinct context(s) (e.g., the imagery included in the animated image of the book, the animated image regarding study, and/or the like) with at least a portion of the imagery determined to be associated with the advertisement content (e.g., the background indicating the "BRAND_NAME" of the particular brand of coffee, the logo associated with the particular brand of coffee, the cup having such logo, and/or the like).

In some embodiments, generating the data describing the new animated image(s) can include augmenting at least a portion of the imagery determined to be associated with the different and distinct context(s) (e.g., the imagery included in the animated image of the book, the animated image regarding study, and/or the like) with at least a portion of the text determined to be associated with the advertisement content (e.g., "BRAND_NAME," and/or the like).

In some embodiments, the computing system can utilize one or more machine learning (ML) models to determine one or more of the additional context(s) for presenting the advertisement content, generate one or more portions of the data describing the new animated image(s), and/or the like.

In some embodiments, the computing system can generate data describing an interface comprising a report regarding the advertisement content, communicate (e.g., via the network(s), and/or the like) such data to one or more computing devices (e.g., associated with the entity that is the subject of, creates, maintains, coordinates, manages, and/or the like the advertisement content), and/or the like. In some of such embodiments, the computing system can receive (e.g., from such computing device(s), via the network(s), and/or the like) data indicating feedback regarding the advertisement content generated via the interface comprising the report, and can utilize at least a portion of the data indicating such feedback to determine one or more of the additional context(s) for presenting the advertisement content, generate one or more portions of the data describing the new animated image(s), and/or the like.

In some embodiments, one or more users (e.g., utilizing the user device providing the dynamic keyboard interface, the different and distinct user device providing the dynamic keyboard interface, another different and distinct user device providing the dynamic keyboard interface, and/or the like) can perform one or more actions that provide one or more new contexts, for example, of such user device(s), the dynamic keyboard interface, the application (e.g., the messaging application, and/or the like) in association with which the dynamic keyboard interface is provided, the different and distinct application (e.g., the email application, and/or the like) in association with which the dynamic keyboard interface is provided, and/or the like. Data indicating such context(s) can be generated (e.g., by the user device(s), the dynamic keyboard interface, and/or the like), communicated to the computing system (e.g., via the network(s), and/or the like), and received by the computing system, which can update the record(s) regarding the corpus of animated images based at least in part on such data.

Based at least in part on such data, the record(s) regarding the corpus of animated images, and/or the like, the computing system can identify a plurality of different animated images associated with the new context(s) for presentation by the dynamic keyboard interface in association with the application(s) (e.g., animated images relevant, responsive, and/or the like to the new context(s)). In some embodiments, one or more of the plurality of different animated images associated with the new context(s) can include one or more of the new animated image(s) comprising the portion(s) of the advertisement content.

Data indicating the plurality of different animated images associated with the new context(s), can be generated (e.g., by the computing system, and/or the like) and communicated (e.g., via the network(s), and/or the like) to the dynamic keyboard interface (e.g., the user device(s), and/or the like), which can present the plurality of different animated images associated with the new context(s) in association with the application(s), and/or the like. For example, the plurality of different animated images associated with the new context(s) can be presented in an ordered, sorted, and/or the like fashion (e.g., animated images determined to be more relevant, responsive, and/or the like to the new context(s) can be presented earlier, more prominently, and/or the like).

The technology described herein can provide a number of technical effects and benefits. For example, as previously indicated, the technology described herein can generate animated images determined to be relevant, responsive, and/or the like to a given context, thereby reducing time spent browsing for, locating, and/or the like such animated images, thus conserving computing resources (e.g., energy, processing cycles, network bandwidth, and/or the like).

With reference now to the Figures, example embodiments of the present disclosure will be discussed in further detail.

FIG. 1 depicts an example computing environment according to example embodiments of the present disclosure.

Referring to FIG. 1, environment 100 can include one or more computing devices (e.g., one or more desktop computers, laptop computers, tablet computers, mobile devices, smartphones, wearable devices, servers, and/or the like). For example, environment 100 can include computing devices 10, 20, 30, 40, and 50 and computing system 112, which can include one or more computing devices. Environment 100 can also include one or more networks 110 (e.g., one or more wired networks, wireless networks, and/or the like). Network(s) 110 can interface computing device(s) 10, 20, 30, 40, and/or 50 with one another and/or with computing system 112.

Computing device 10 can include one or more processor(s) 102, one or more communication interfaces 104, and memory 106 (e.g., one or more hardware components for storing executable instructions, data, and/or the like). Communication interface(s) 104 can enable computing device 10 to communicate with computing device(s) 20, 30, 40, and/or 50 and/or with computing system 112. Memory 106 can include (e.g., store, and/or the like) instructions 108. When executed by processor(s) 102, instructions 108 can cause computing device 10 to perform one or more operations, functions, and/or the like described herein. It will be appreciated that computing device(s) 20, 30, 40, and/or 50 can include one or more of the components described above with respect to computing device 10.

Computing system 112 can include one or more processor(s) 114, one or more communication interfaces 116, and memory 118 (e.g., one or more hardware components for storing executable instructions, data, and/or the like). Communication interface(s) 116 can enable computing system 112 to communicate with computing device(s) 10, 20, 30, 40, and/or 50. Memory 118 can include (e.g., store, and/or the like) instructions 120. When executed by processor(s) 114, instructions 120 can cause computing system 112 to perform one or more operations, functions, and/or the like described herein.

Unless explicitly indicated otherwise, the operations, functions, and/or the like described herein can be performed by computing device(s) 10, 20, 30, 40, and/or 50 and/or computing system 112 (e.g., by computing device 10, 20, 30, 40, or 50, by computing system 112, by a combination of one or more of computing device(s) 10, 20, 30, 40, and/or 50 and/or computing system 112, and/or the like).

FIGS. 2A-E depict an example event sequence according to example embodiments of the present disclosure.

Figure 2A:
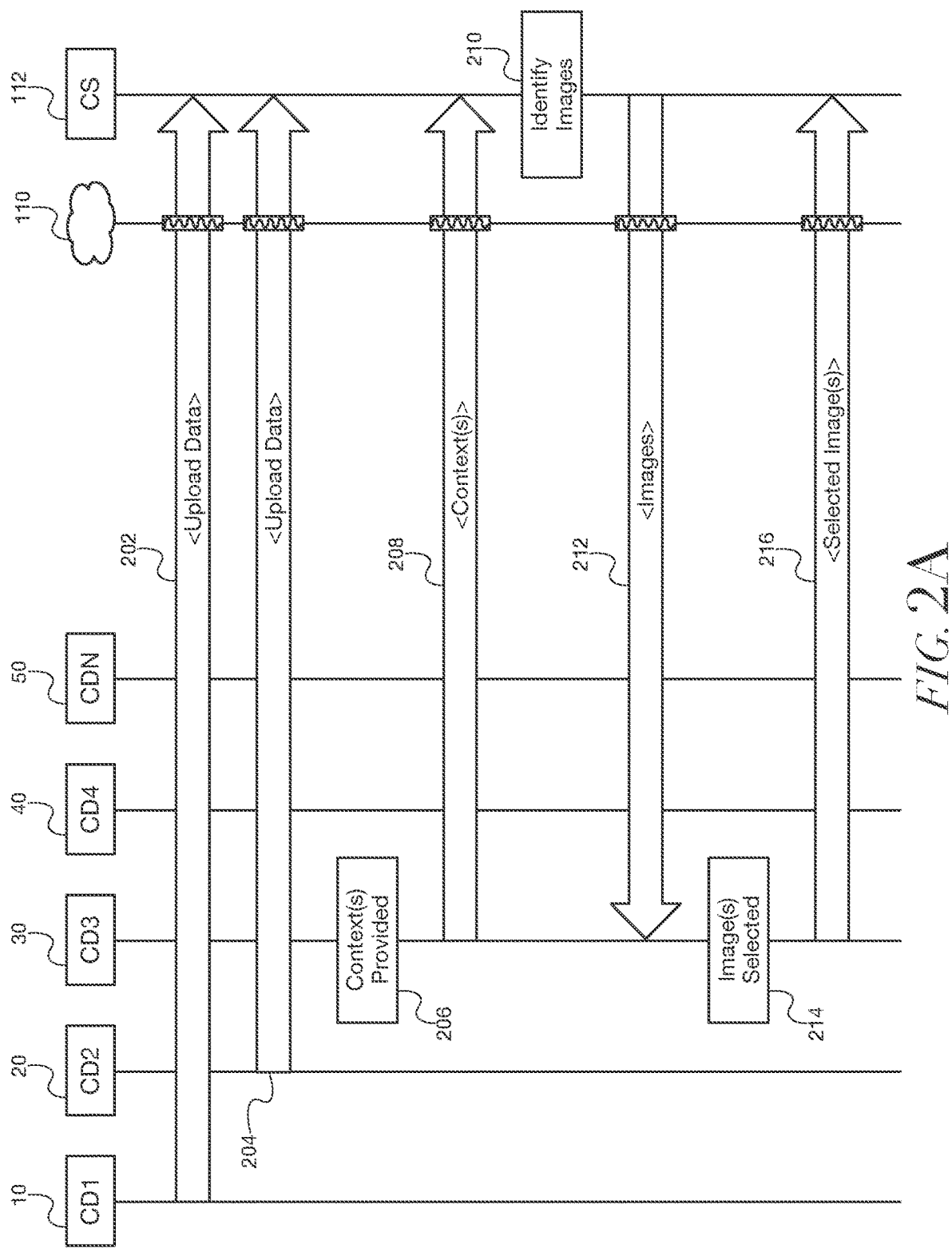
FIGS. 2A-E depict an example event sequence according to example embodiments of the present disclosure.

Referring to FIG. 2A, at (202), computing device 10 can communicate (e.g., via network(s) 110 (as indicated by the pattern-filled box over the line extending downward from network(s) 110), and/or the like) data describing one or more animated images (e.g., graphics interchange format (GIF) images, and/or the like), advertisements, advertisement content, contexts in which to present such animated image(s), advertisement(s), advertisement content, and/or the like to computing system 112, which can receive and store such data, one or more records generated based at least in part thereon, and/or the like. For example, computing system 112 can be remotely located from computing device(s) 10, 20, 30, 40, and/or 50 and can receive uploads to, store, index, manage, and/or the like a corpus of animated images, one or more records regarding such corpus, and/or the like. Similarly, at (204), computing device 20 can communicate data describing one or more animated images, advertisements, advertisement content, contexts in which to present such animated image(s), advertisement(s), advertisement content, and/or the like to computing system 112, which can receive and store such data, one or more records generated based at least in part thereon, and/or the like.

Computing device 30 can be a user device (e.g., one or more associated computing devices at least temporarily associated with a particular user, user account, and/or the like). Computing device 40 can be a user device (e.g., one or more associated computing devices at least temporarily associated with a different and distinct user, user account, and/or the like) different and distinct from computing device 30. Similarly, computing device 50 can be a user device (e.g., one or more associated computing devices at least temporarily associated with a further different and distinct user, user account, and/or the like) different and distinct from computing devices 30 and 40.

Figure 3A:
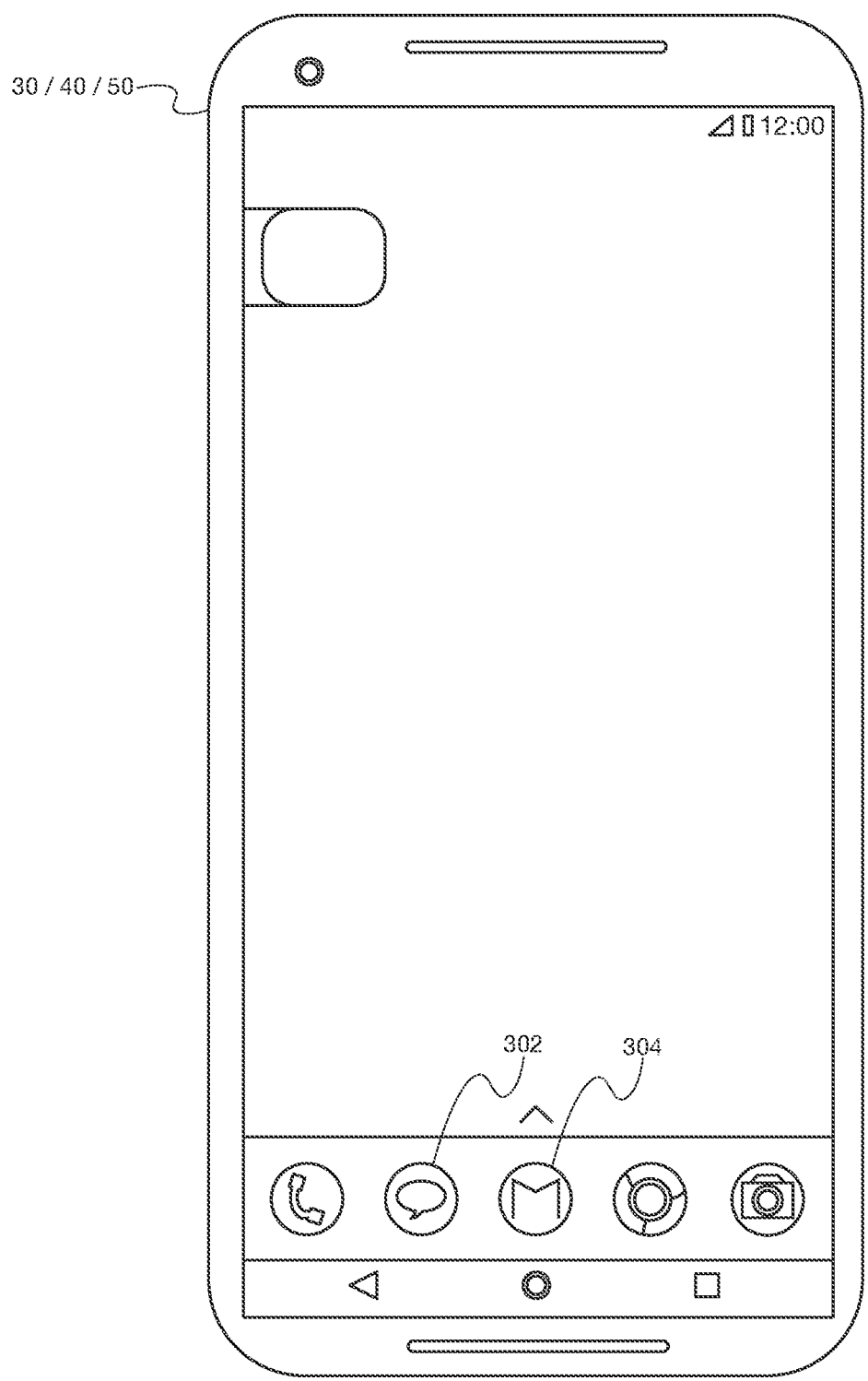
FIGS. 3A-P depict example graphical user interfaces (GUIs) according to example embodiments of the present disclosure.

Computing device(s) 30, 40, and/or 50 can execute one or more different and distinct applications. For example, referring to FIG. 3A, computing device(s) 30, 40, and/or 50 can execute an application (e.g., a messaging application, and/or the like) associated with graphical user interface (GUI) element 302, a different and distinct application (e.g., an email application, and/or the like) associated with element 304, and/or the like.

Figure 3B:
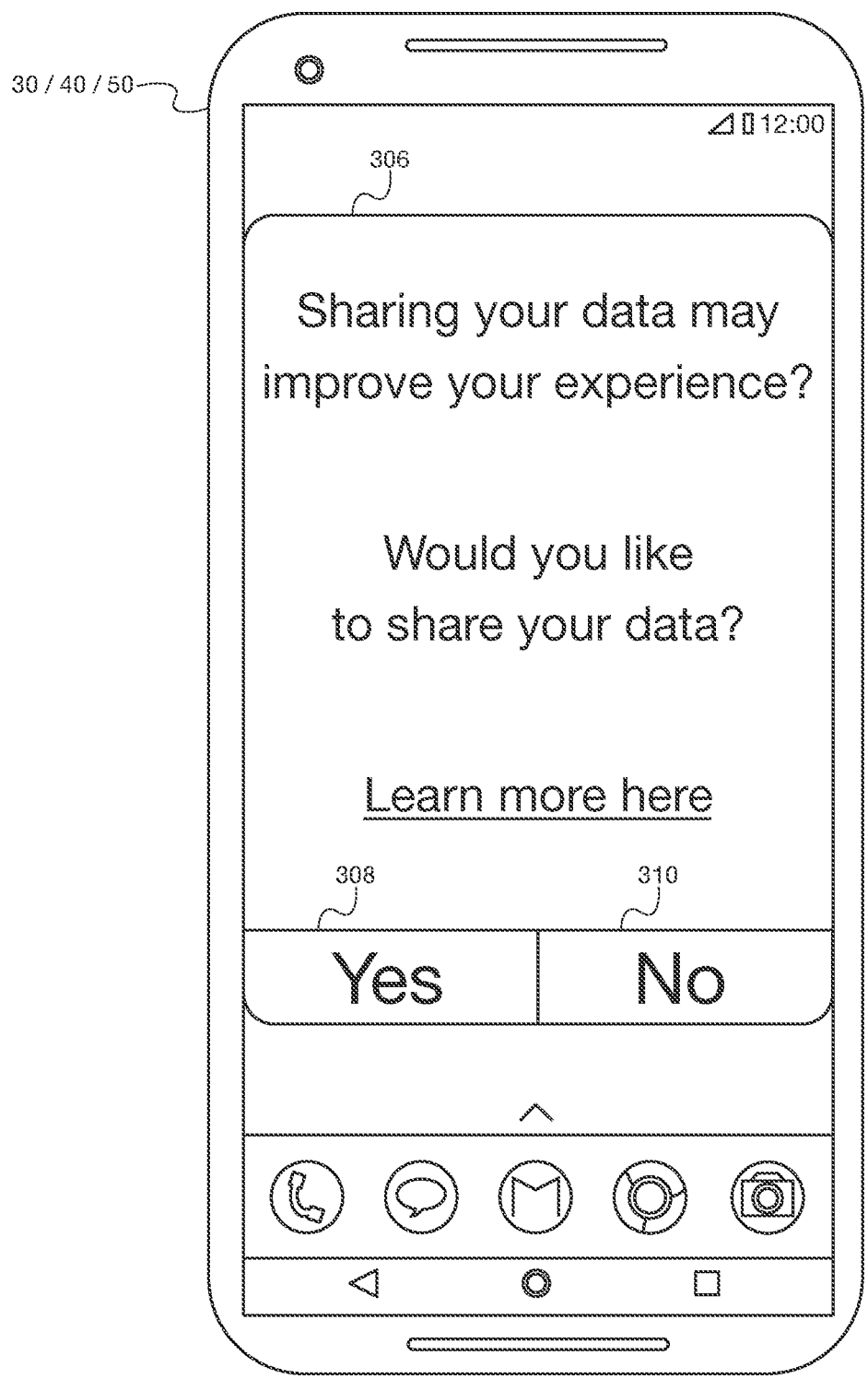

Referring to FIG. 3B, in some embodiments (e.g., to mitigate potential privacy concerns, and/or the like), one or more users of computing device(s) 30, 40, and/or 50 can be provided (e.g., via element 306, and/or the like) with information regarding collection of certain data, and/or the like, one or more controls (e.g., via element(s) 308 and/or 310, and/or the like) for allowing the user(s) to make one or more elections as to if and/or when the methods, systems, functions, operations, and/or the like described herein can enable collection of certain data, and/or the like (e.g., presented by and/or input into the application(s), the dynamic keyboard interface described herein, and/or the like). Additionally or alternatively, certain data (e.g., presented by and/or input into the application(s), the dynamic keyboard interface described herein, and/or the like) can be treated in one or more ways before being stored, utilized, and/or the like (e.g., so personally identifiable information can be removed, and/or the like). For example, a user's identity, data associated therewith, and/or the like can be treated so that no personally identifiable information can be determined for the user, and/or the like. Thus, the user(s) can have control over what data is collected about them, how that information is used, what information they are provided, and/or the like.

Figure 3C:
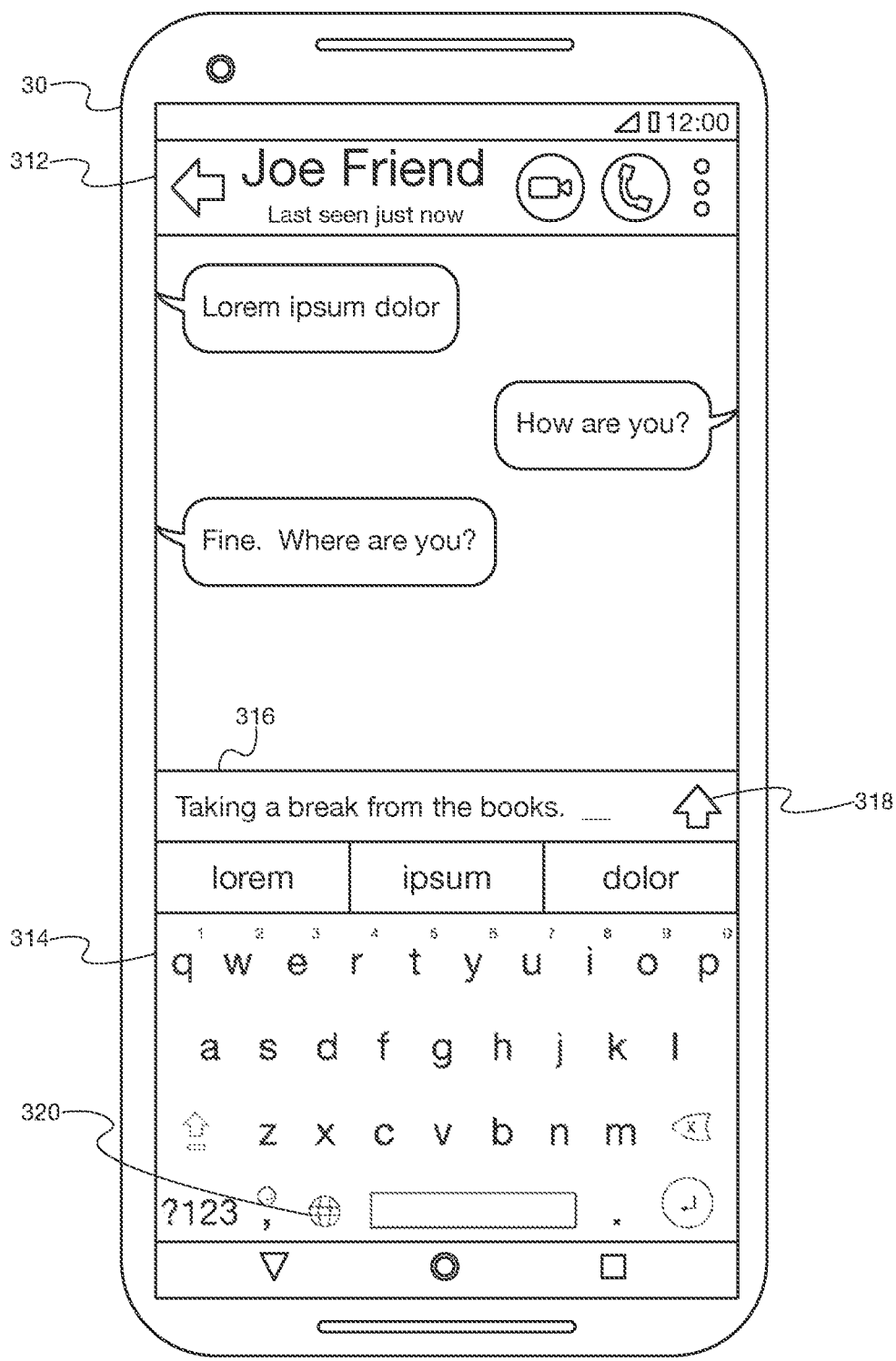

In accordance with aspects of the disclosure, a dynamic keyboard interface (e.g., for use via a touchscreen, and/or the like) can be provided (e.g., as part of an operating system (OS), third-party application, plugin, and/or the like) to, by, and/or the like computing device(s) 30, 40, and/or 50. For example, referring to FIG. 3C, portion 314 of the illustrated GUI can be associated with such a dynamic keyboard interface. One or more aspects of the dynamic keyboard interface can be configured to provide access (e.g., via search functionality, suggestion functionality, browsing functionality, and/or the like) to the corpus of animated images uploaded to, stored by, indexed by, managed by, and/or the like computing system 112. The dynamic keyboard interface can be provided in association with one or more of the application(s) executed by computing device(s) 30, 40, and/or 50. For example, portion 312 can be associated with the application (e.g., the messaging application, and/or the like) associated with element 302, and, as illustrated, the dynamic keyboard interface can be provided in association with such application.

Element 316 can correspond to an input area (e.g., for composing a message, and/or the like), and element 318 can correspond to an option to communicate the data located in such input area to the application associated with portion 312 (e.g., for subsequent communication over network(s) 110 to a computing device associated with "Joe Friend," and/or the like).

Element 320 can be configured to cause the dynamic keyboard interface to toggle, flip, rotate, and/or the like between various different keyboards, for example, associated with different languages, alphabets, and/or the like (e.g., the illustrated qwerty keyboard, and/or the like). In accordance with aspects of the disclosure, such keyboards can include an animated-image keyboard configured to present (e.g., for browsing, selection, and/or the like) various different animated images.

At (206), a user can perform one or more actions that provide one or more different and distinct contexts associated with computing device 30. The context(s) provided can be of computing device 30, the dynamic keyboard interface, the application associated with portion 312, and/or the like. For example, the user can locate computing device 30 at a particular geographic location, interact with the application associated with portion 312 via its interface, and/or the like.

At (208), computing device 30 (e.g., the dynamic keyboard interface, and/or the like) can generate data indicating such context(s) and can communicate such data to computing system 112, which can receive the data and update the record(s) regarding the corpus of animated images based at least in part thereon. In some embodiments, the data indicating the context(s) can indicate data presented by and/or input into the dynamic keyboard interface, the application associated with portion 312, and/or the like (e.g., "Taking a break from the books."; and/or the like). Additionally or alternatively, the data indicating the context(s) can indicate a current time, time of day, date, day of week, month, year, and/or the like; a size of an audience associated with computing device 30, the context of the application associated with portion 312, and/or the like; a human-language setting associated with computing device 30; a geographic area to which computing device 30 is registered; a network identifier associated with computing device 30; a current geographic location of computing device 30; and/or the like.

Based at least in part on the data indicating the context(s), the record(s) regarding the corpus of animated images, and/or the like, at (210), computing system 112 can identify a plurality of different animated images associated with the context(s) for presentation by the dynamic keyboard interface in association with the application associated with portion 312 (e.g., animated images relevant, responsive, and/or the like to the context(s)).

At (212), computing system 112 can generate data indicating the plurality of different animated images associated with the context(s) and can communicate such data to computing device 30 (e.g., to the dynamic keyboard interface), which can receive the data.

Figure 3D:
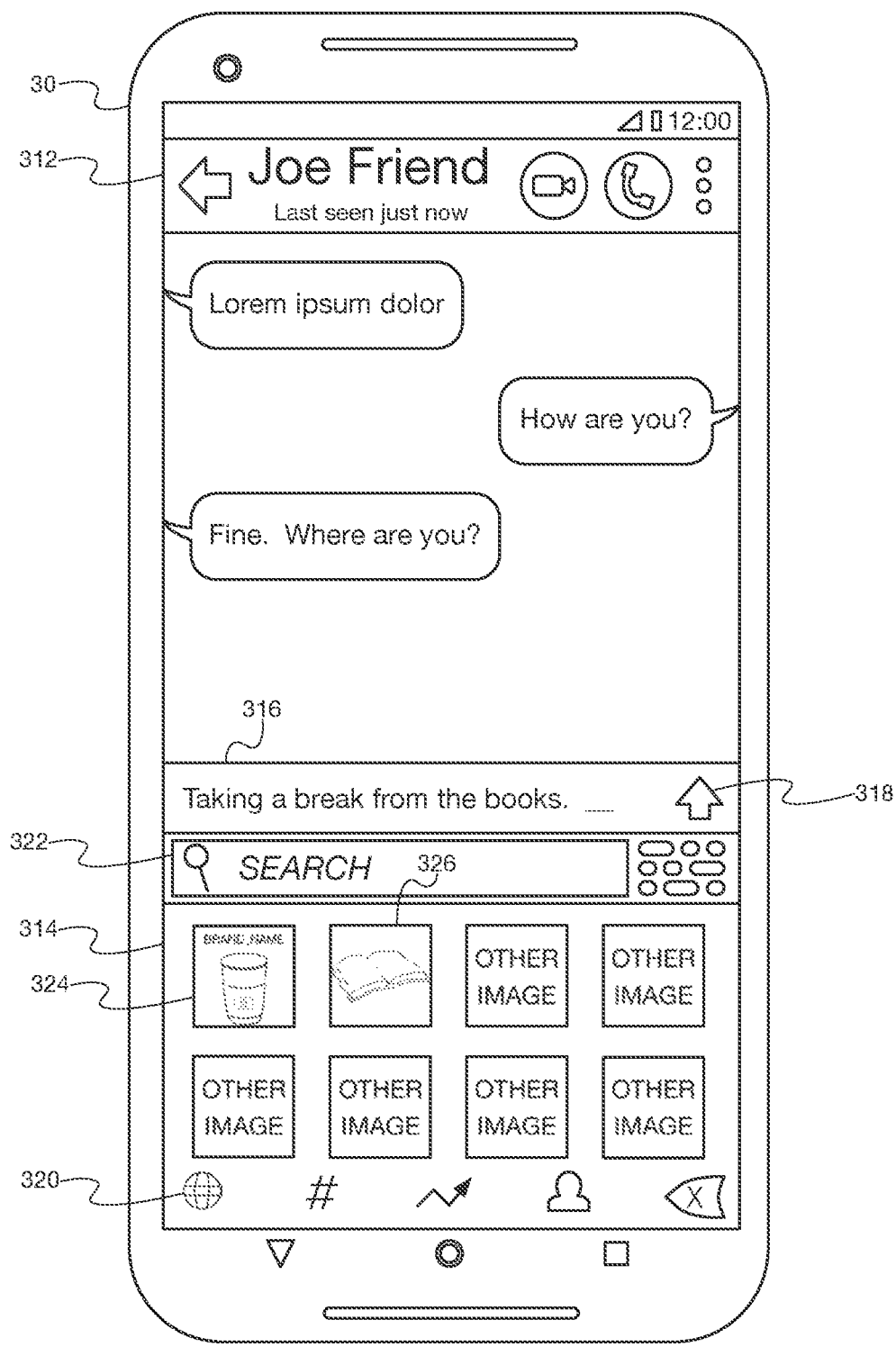

Referring to FIG. 3D, responsive to the user invoking element 320, and/or the like, the dynamic keyboard interface can toggle (e.g., from the qwerty keyboard, and/or the like) to the illustrated animated-image keyboard, and/or the like, which can present the plurality of different animated images associated with the context(s). For example, the plurality of different animated images associated with the context(s) can be presented in an ordered, sorted, and/or the like fashion (e.g., animated images determined to be more relevant, responsive, and/or the like to the context(s) can be presented earlier, more prominently, and/or the like).

Figure 4A:
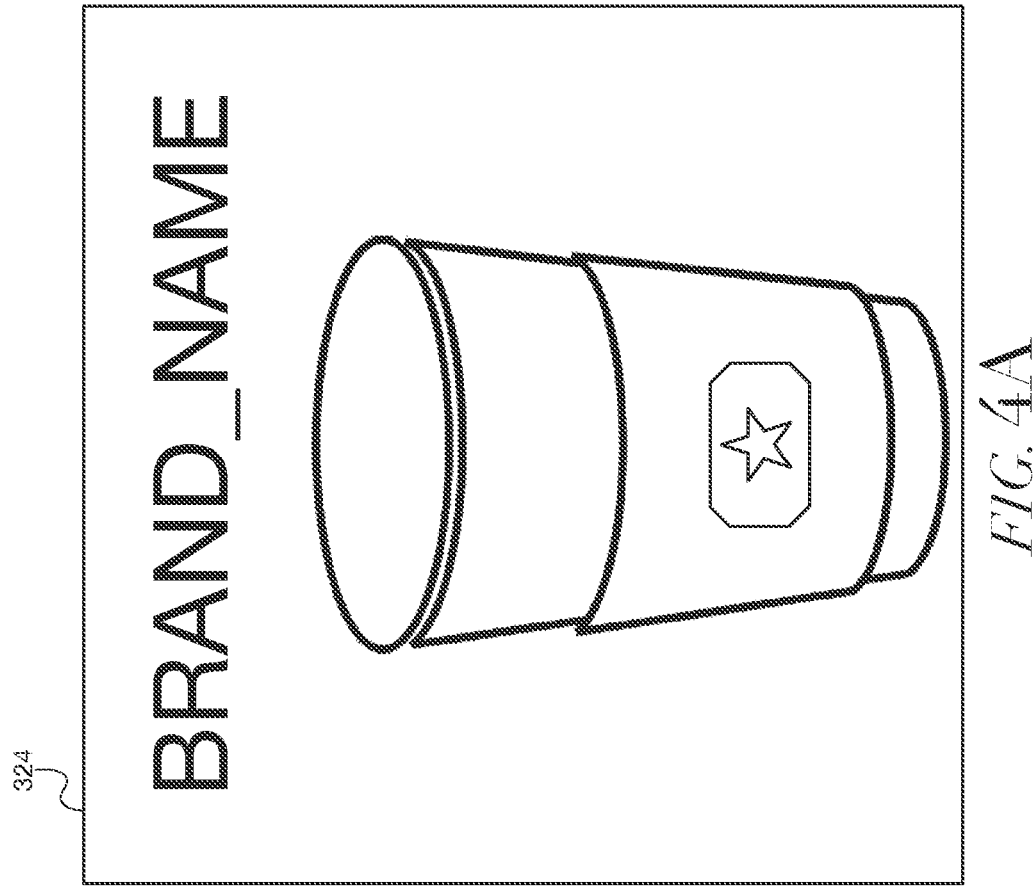
FIGS. 4A-F depict example animated images according to example embodiments of the present disclosure.
Figure 4B:
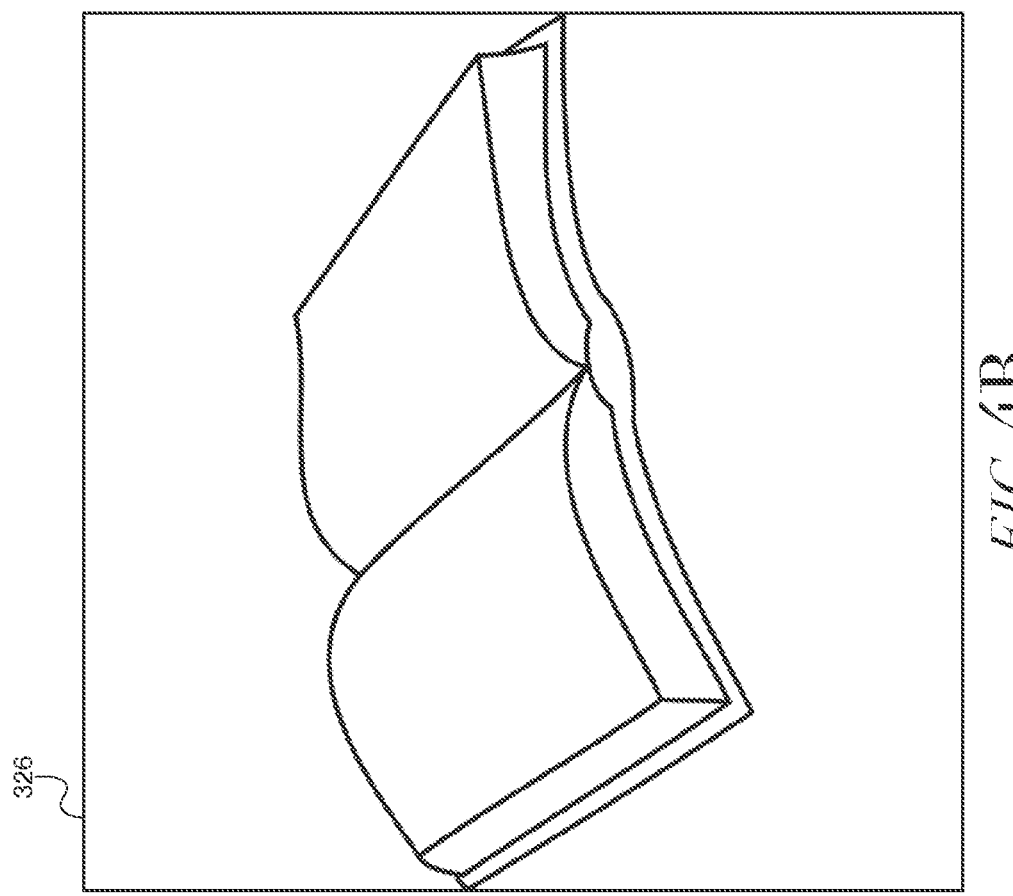

As illustrated, multiple different animated images from the plurality of different animated images associated with the context(s) can be simultaneously displayed by the dynamic keyboard interface alongside one another. For example, the dynamic keyboard interface can simultaneously display animated images 324 (depicted separately, in greater detail in FIG. 4A) and 326 (depicted separately, in greater detail in FIG. 4B), amongst others of the plurality of different animated images associated with the context(s) and/or the like. It will be appreciated that the plurality of different animated images associated with the context(s) can include additional animated images (not illustrated), which can, for example, be displayed by interacting with the interface (e.g., swiping left, and/or the like).

In some embodiments, one or more of the plurality of different animated images associated with the context(s) can include one or more advertisements, advertisement content, and/or the like (e.g., for one or more products, services, media content items, and/or the like). In some embodiments, one or more of such animated image(s) can include data (e.g., a link, and/or the like) configured to cause an application executed by computing device(s) 30, 40, and/or 50 (e.g., a web browser, an application associated with the subject, source, and/or the like of the advertisement, advertisement content, and/or the like) to present, navigate to, and/or the like content associated with the advertisement, advertisement content, and/or the like.

For example, the data received from computing device 10 (e.g., at (202), and/or the like) can comprise data describing advertisement content (e.g., for a particular brand of coffee, and/or the like), one or more contexts (e.g., coffee generally, geographic locations at which the particular brand of coffee is available, and/or the like) in which to present the advertisement content, and/or the like; computing system 112 can generate data describing one or more animated images (e.g., animated image 324, and/or the like) comprising one or more portions of the advertisement content; the data received from computing device 30 (e.g., at (208), and/or the like) can comprise data indicating a context of computing device 30 (e.g., a current geographic location of computing device 30, and/or the like) corresponding at least in part to one or more of the context(s) (e.g., geographic locations at which the particular brand of coffee is available, and/or the like) in which to present the advertisement content; and, based at least in part on the data received from computing device 10 (e.g., at (202), and/or the like), the data received from computing device 30 (e.g., at (208), and/or the like), the record(s) regarding the corpus of animated images, and/or the like, computing system 112 can identify one or more of the animated image(s) (e.g., animated image 324, and/or the like) comprising the portion(s) of the advertisement content for inclusion in the plurality of different animated images associated with the context(s) for presentation by the dynamic keyboard interface in association with the application associated with portion 312 (e.g., animated images relevant, responsive, and/or the like to the context(s)).

Additionally or alternatively, one or more of the plurality of different animated images associated with the context(s) can include one or more animated images that do not include advertisement content. For example, the data received from computing device 30 (e.g., at (208), and/or the like) can comprise data (e.g., the data indicating the data presented by and/or input into the dynamic keyboard interface, the application associated with portion 312, and/or the like) indicating a context of computing device 30 corresponding at least in part to one or more contexts (e.g., books, and/or the like) different and distinct from the context(s) in which to present the advertisement content; and, based at least in part on the data received from computing device 30 (e.g., at (208), and/or the like), the record(s) regarding the corpus of animated images, and/or the like, computing system 112 can identify one or more animated images (e.g., animated image 326, and/or the like) determined by computing system 112 to be associated with such different and distinct context(s), and/or the like for inclusion in the plurality of different animated images associated with the context(s) for presentation by the dynamic keyboard interface in association with the application associated with portion 312 (e.g., animated images relevant, responsive, and/or the like to the context(s)).

Figure 3E:
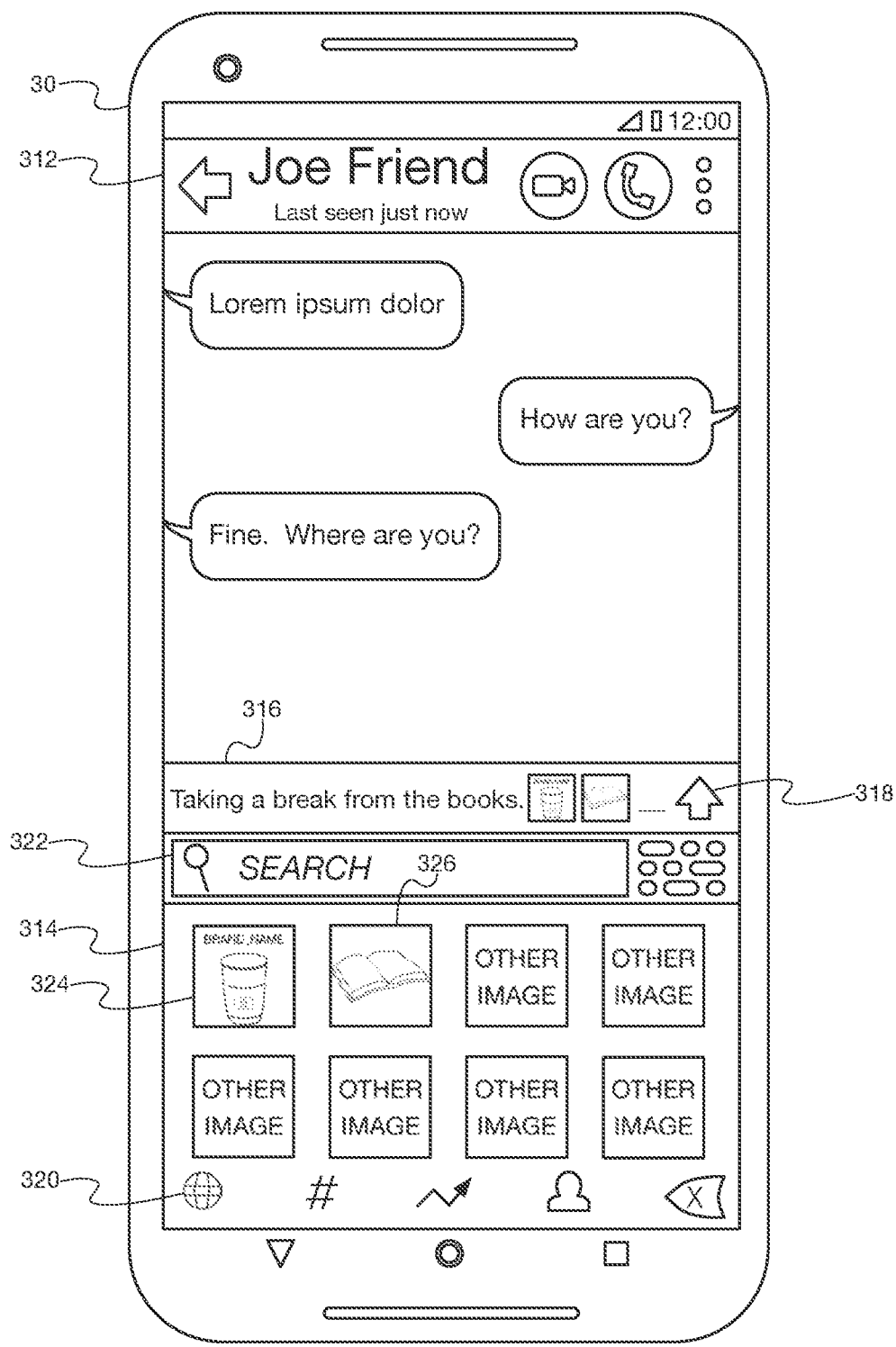
Figure 3F:
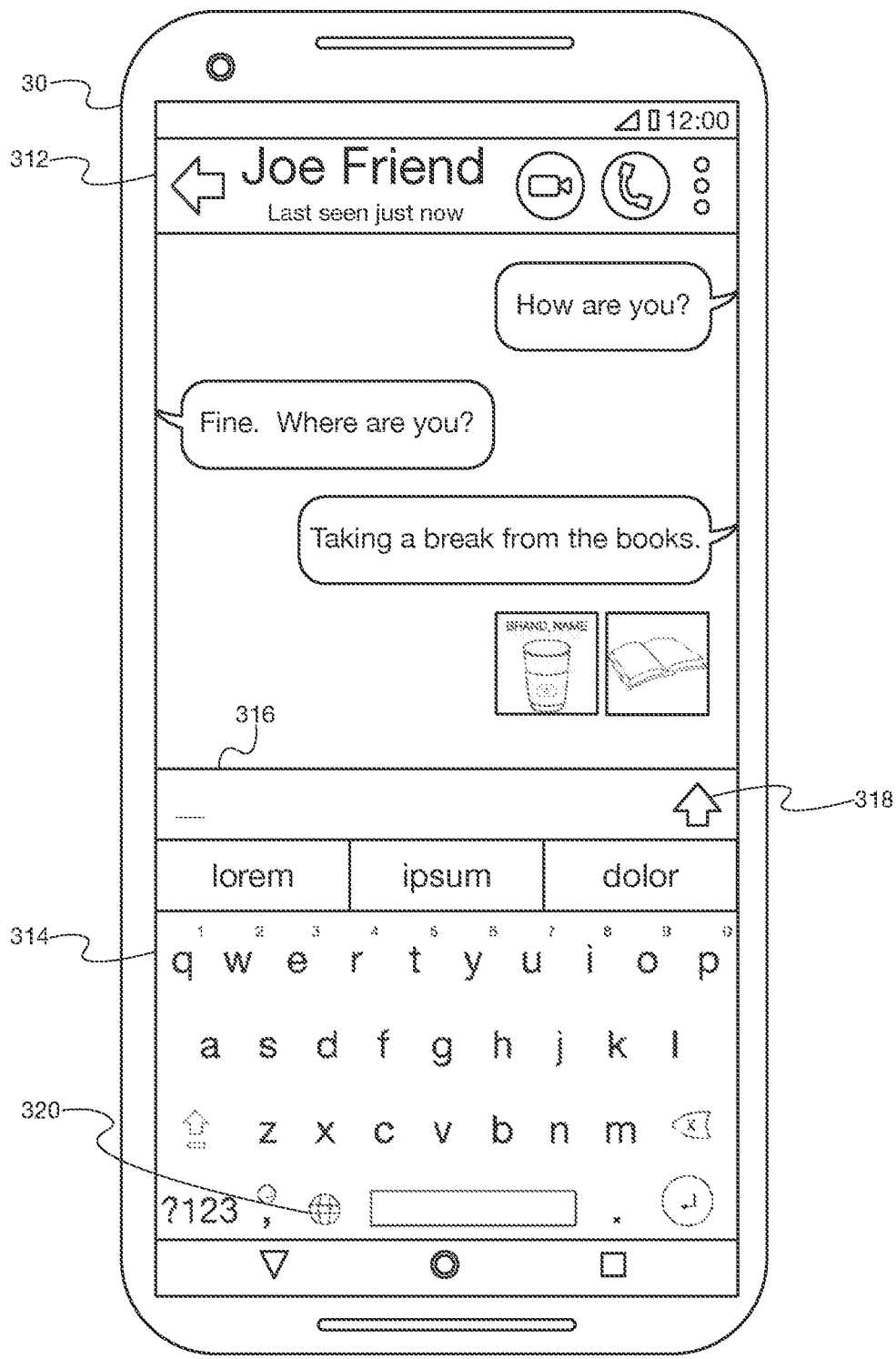

At (214), a user can select one or more particular animated images from amongst the plurality of different animated images associated with the context(s) via the dynamic keyboard interface. In some embodiments, the user can select one or more of the particular animated image(s) for communication (e.g., input, pasting, and/or the like) by the dynamic keyboard interface to the application associated with portion 312. Additionally or alternatively, the user can select one or more of the particular animated image(s) for future accessibility within the dynamic keyboard interface (e.g., designate such particular animated image(s) for frequent use, "favorite" them, and/or the like). For example, referring to FIG. 3E, the user can select animated images 324 and 326 for communication by the dynamic keyboard interface to the application associated with portion 312, and/or the like, and, referring to FIG. 3F, responsive to the user invoking element 318, and/or the like, the dynamic keyboard interface can communicate animated images 324 and 326 to the application associated with portion 312, and/or the like.

Figure 2B:
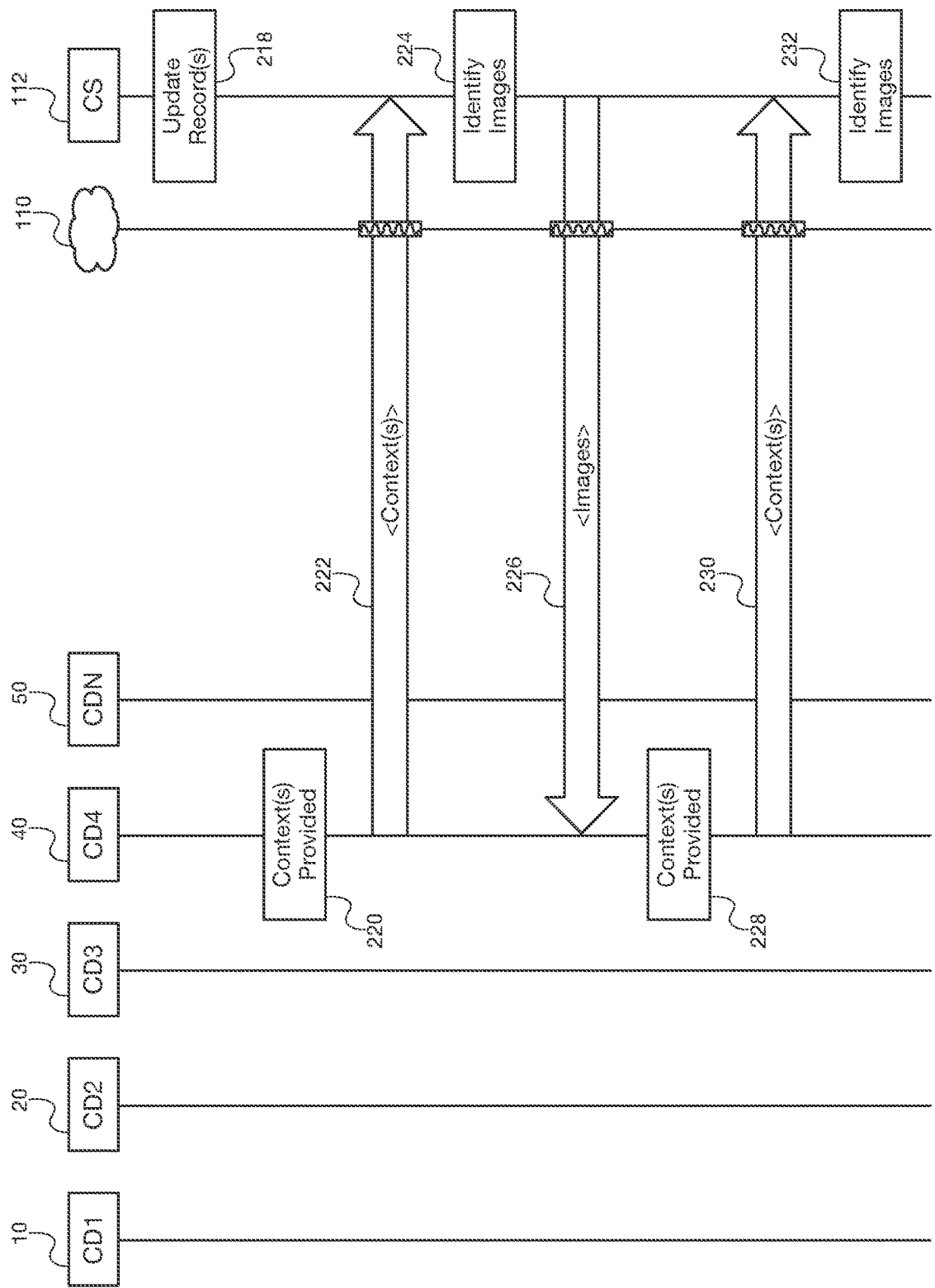

At (216), computing device 30 can generate data indicating the selection(s), selection type(s) (e.g., for communication to the application associated with portion 312, and/or the like), particular animated image(s) selected (e.g., animated images 324, 326, and/or the like) and can communicate such data to computing system 112, which can receive the data and, referring to FIG. 2B, at (218), can update the record(s) regarding the corpus of animated images based at least in part thereon.

Figure 3G:
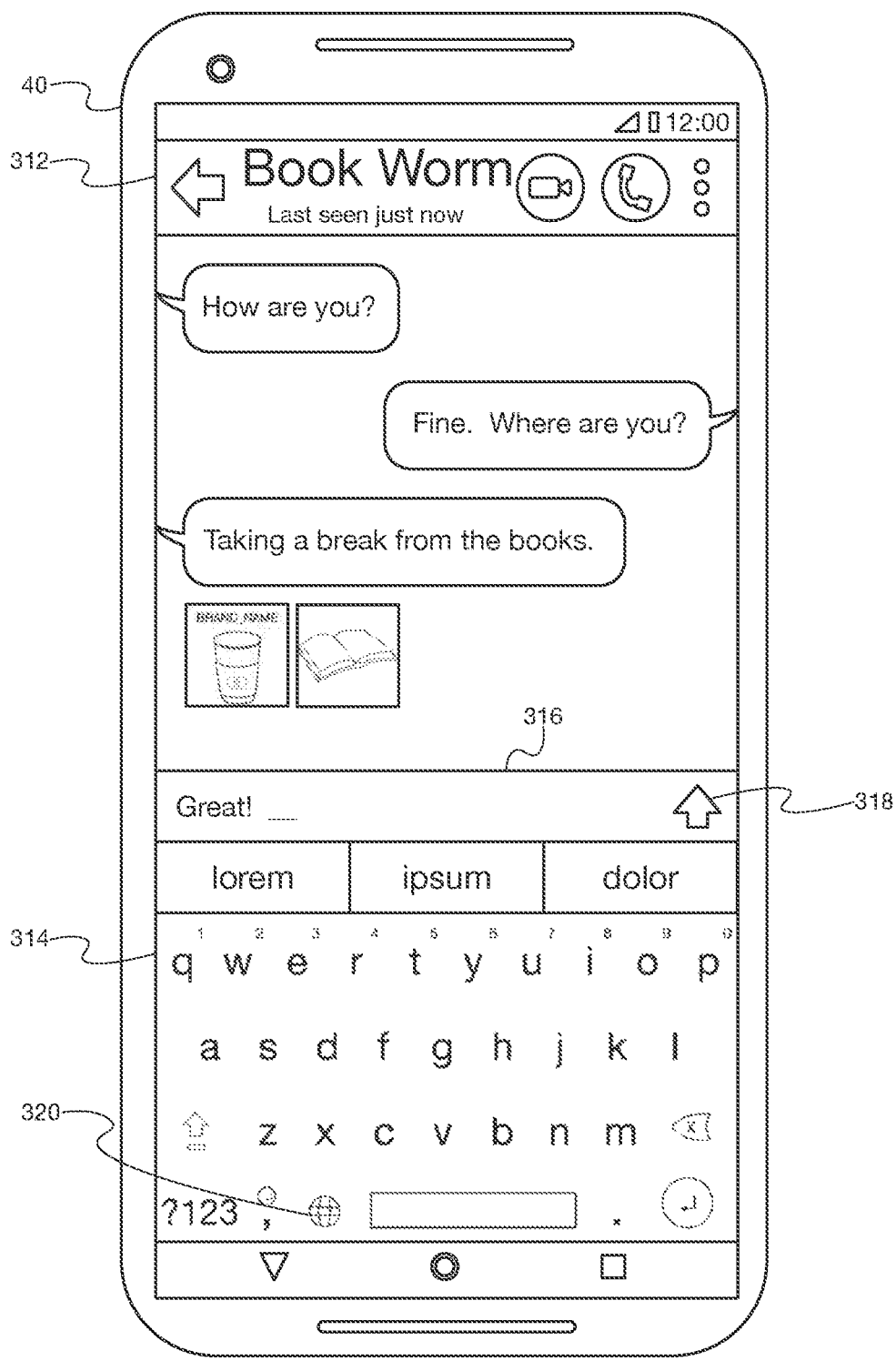

At (220), a user can perform one or more actions that provide one or more different and distinct contexts associated with computing device 40. The context(s) provided can be of computing device 40, the dynamic keyboard interface, the application associated with portion 312, and/or the like. For example, referring to FIG. 3G, the user can interact with the application associated with portion 312 via its interface, and/or the like.

At (222), computing device 40 (e.g., the dynamic keyboard interface, and/or the like) can generate data indicating such context(s) and can communicate such data to computing system 112, which can receive the data and update the record(s) regarding the corpus of animated images based at least in part thereon. In some embodiments, the data indicating the context(s) can indicate data presented by and/or input into the dynamic keyboard interface, the application associated with portion 312, and/or the like (e.g., "Taking a break from the books."; "Great!"; and/or the like). Additionally or alternatively, the data indicating the context(s) can indicate a current time, time of day, date, day of week, month, year, and/or the like; a size of an audience associated with computing device 40, the context of the application associated with portion 312, and/or the like; a human-language setting associated with computing device 40; a geographic area to which computing device 40 is registered; a network identifier associated with computing device 40; a current geographic location of computing device 40; and/or the like.

Based at least in part on the data indicating the context(s), the record(s) regarding the corpus of animated images, and/or the like, at (224), computing system 112 can identify a plurality of different animated images associated with the context(s) for presentation by the dynamic keyboard interface in association with the application associated with portion 312 (e.g., animated images relevant, responsive, and/or the like to the context(s)).

At (226), computing system 112 can generate data indicating the plurality of different animated images associated with the context(s) and can communicate such data to computing device 40 (e.g., to the dynamic keyboard interface), which can receive the data.

Figure 3H:
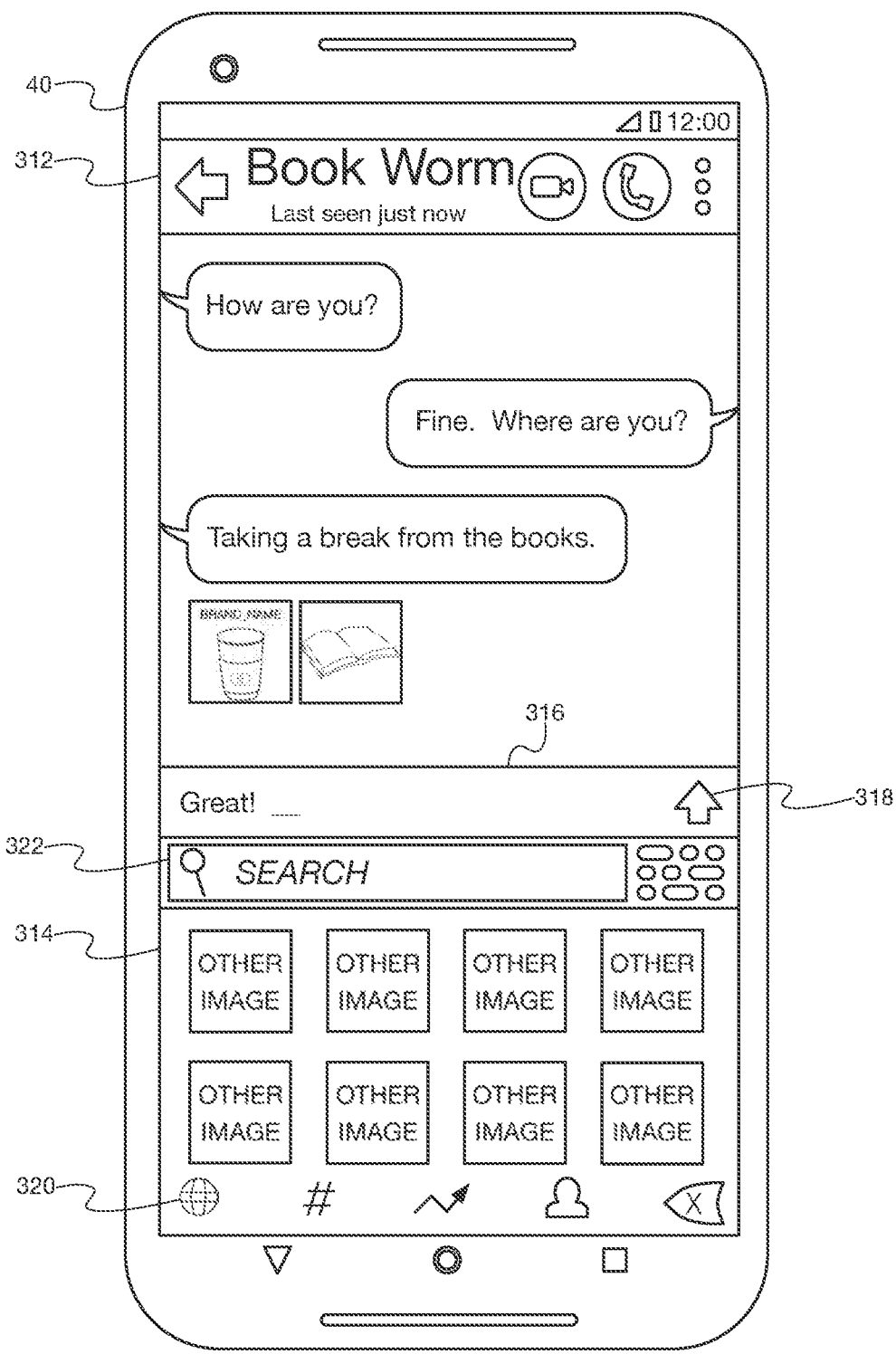

Referring to FIG. 3H, responsive to the user invoking element 320, and/or the like, the dynamic keyboard interface can toggle (e.g., from the qwerty keyboard, and/or the like) to the illustrated animated-image keyboard, and/or the like, which can present the plurality of different animated images associated with the context(s). For example, the plurality of different animated images associated with the context(s) can be presented in an ordered, sorted, and/or the like fashion (e.g., animated images determined to be more relevant, responsive, and/or the like to the context(s) can be presented earlier, more prominently, and/or the like). As illustrated, multiple different animated images from the plurality of different animated images associated with the context(s) can be simultaneously displayed by the dynamic keyboard interface alongside one another.

In some embodiments, one or more of the plurality of different animated images associated with the context(s) can include one or more advertisements, advertisement content, and/or the like (e.g., for one or more products, services, media content items, and/or the like). In some embodiments, one or more of such animated image(s) can include data (e.g., a link, and/or the like) configured to cause an application executed by computing device(s) 30, 40, and/or 50 (e.g., a web browser, an application associated with the subject, source, and/or the like of the advertisement, advertisement content, and/or the like) to present, navigate to, and/or the like content associated with the advertisement, advertisement content, and/or the like. Additionally or alternatively, one or more of the plurality of different animated images associated with the context(s) can include one or more animated images that do not include advertisement content.

Figure 3I:
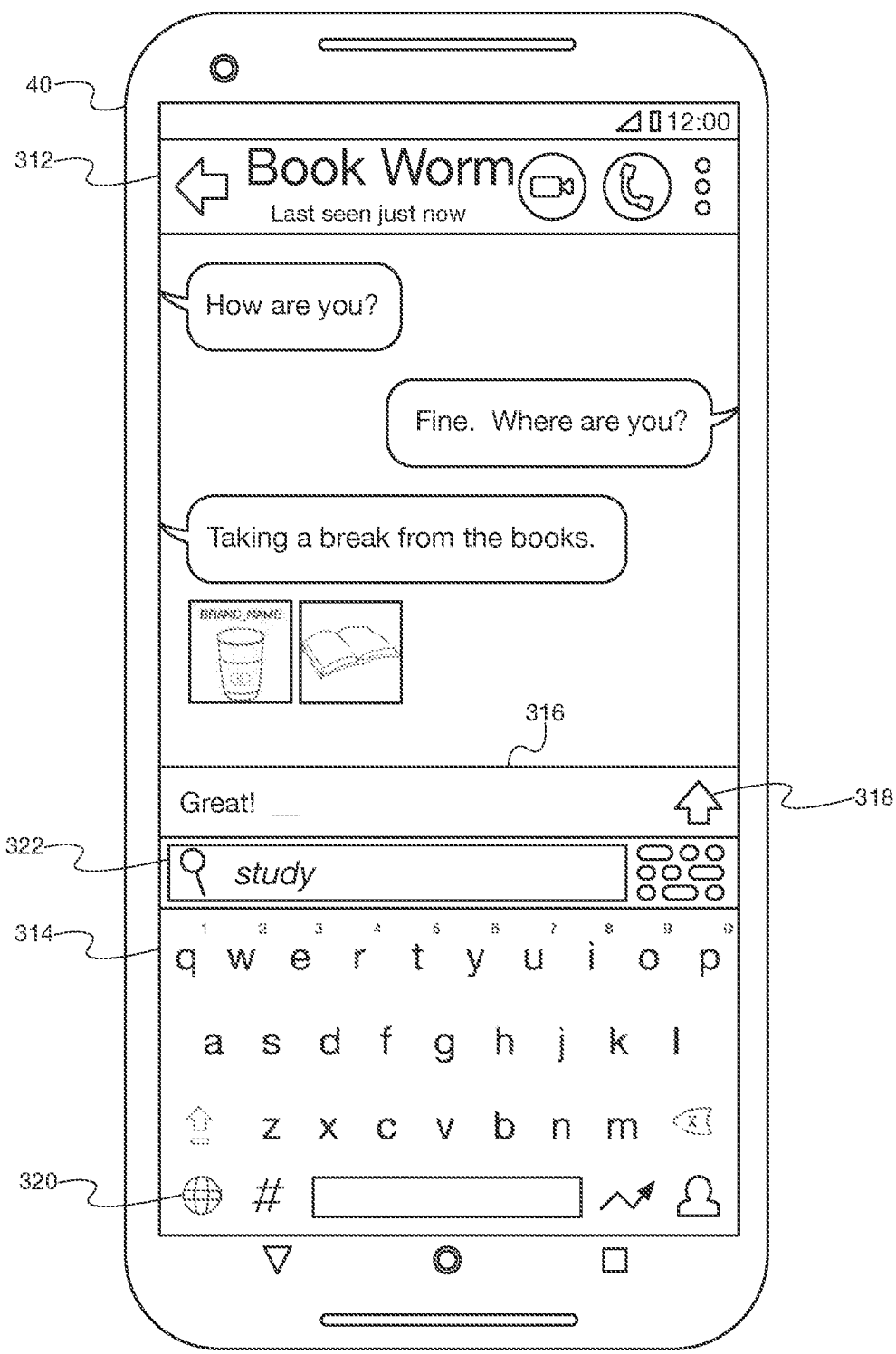

At (228), a user can perform one or more actions that provide one or more different and distinct contexts associated with computing device 40. The context(s) provided can be of computing device 40, the dynamic keyboard interface, the application associated with portion 312, and/or the like. For example, element 322 can correspond to a search box for inputting one or more search terms to be used at least in part to identify one or more animated images, and/or the like, and, referring to FIG. 3I, the user can invoke element 322 and utilize the illustrated keyboard to input one or more search terms (e.g., "study," and/or the like).

At (230), computing device 40 (e.g., the dynamic keyboard interface, and/or the like) can generate data indicating such context(s) and can communicate such data to computing system 112, which can receive the data and update the record(s) regarding the corpus of animated images based at least in part thereon. In some embodiments, the data indicating the context(s) can indicate one or more of the search term(s) (e.g., "study," and/or the like). Additionally or alternatively, the data indicating the context(s) can indicate a current time, time of day, date, day of week, month, year, and/or the like; a size of an audience associated with computing device 40, the context of the application associated with portion 312, and/or the like; a human-language setting associated with computing device 40; a geographic area to which computing device 40 is registered; a network identifier associated with computing device 40; a current geographic location of computing device 40; and/or the like.

Based at least in part on the data indicating the context(s), the record(s) regarding the corpus of animated images, and/or the like, at (232), computing system 112 can identify a plurality of different animated images associated with the context(s) for presentation by the dynamic keyboard interface in association with the application associated with portion 312 (e.g., animated images relevant, responsive, and/or the like to the context(s)).

Figure 2C:
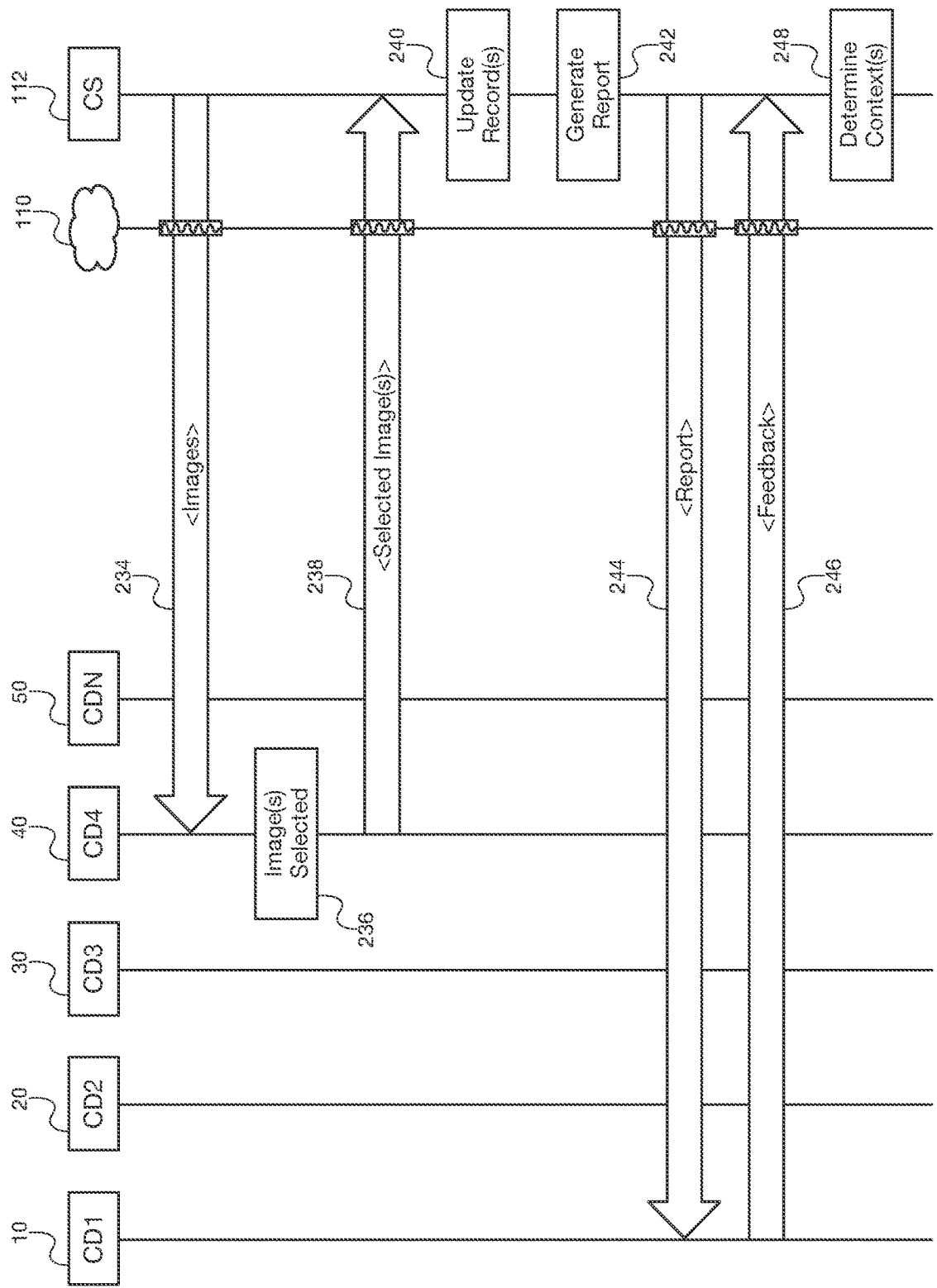
Figure 3J:
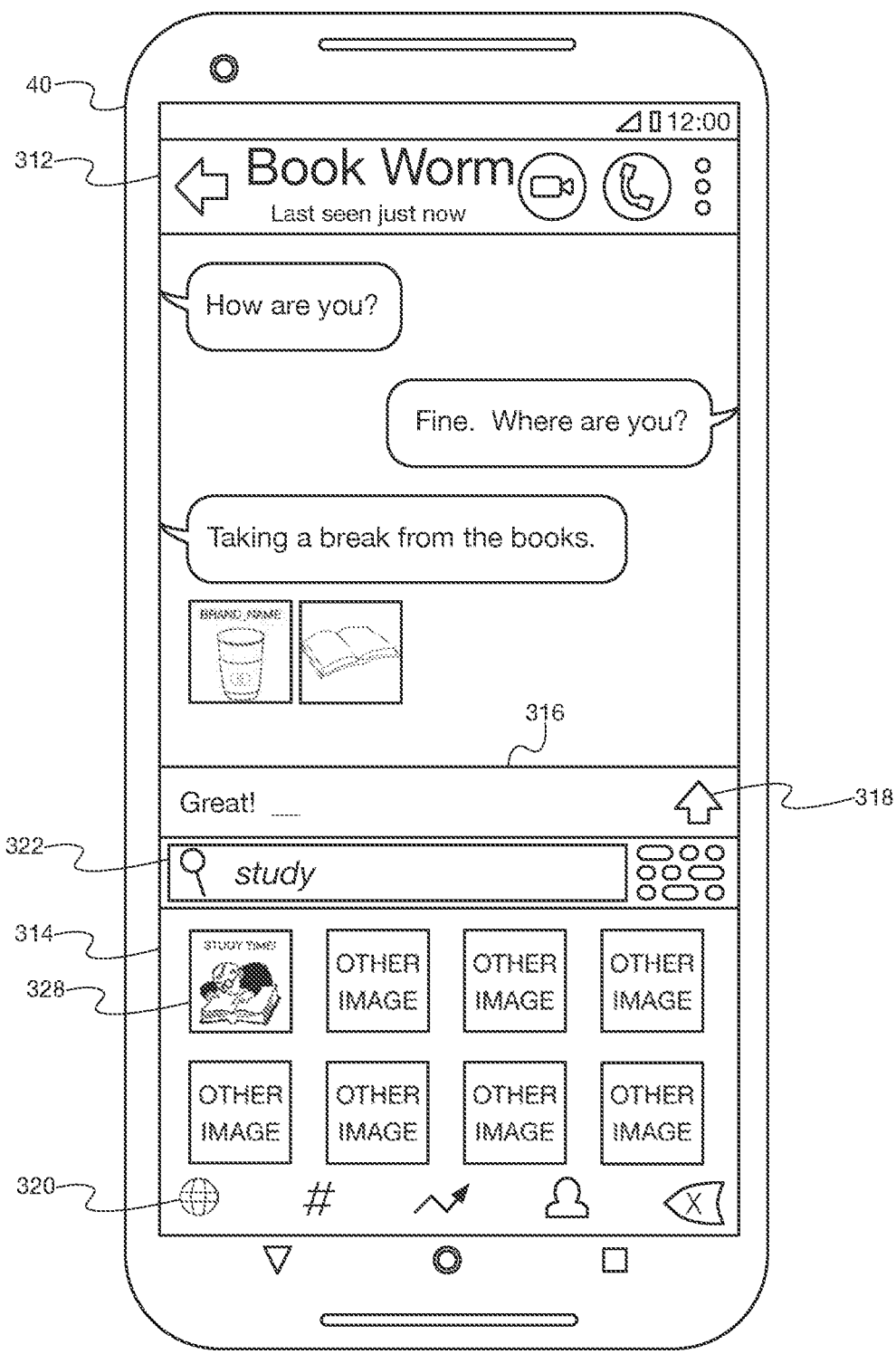

Referring to FIG. 2C, at (234), computing system 112 can generate data indicating the plurality of different animated images associated with the context(s) and can communicate such data to computing device 40 (e.g., to the dynamic keyboard interface), which can receive the data and, referring to FIG. 3J, can toggle (e.g., from the qwerty keyboard, and/or the like) to the illustrated animated-image keyboard, and/or the like, which can present the plurality of different animated images associated with the context(s). For example, the plurality of different animated images associated with the context(s) can be presented in an ordered, sorted, and/or the like fashion (e.g., animated images determined to be more relevant, responsive, and/or the like to the context(s) can be presented earlier, more prominently, and/or the like).

Figure 4C:

As illustrated, multiple different animated images from the plurality of different animated images associated with the context(s) can be simultaneously displayed by the dynamic keyboard interface alongside one another. For example, the dynamic keyboard interface can simultaneously display animated image 328 (depicted separately, in greater detail in FIG. 4C), amongst others of the plurality of different animated images associated with the context(s) and/or the like.

In some embodiments, one or more of the plurality of different animated images associated with the context(s) can include one or more advertisements, advertisement content, and/or the like (e.g., for one or more products, services, media content items, and/or the like). In some embodiments, one or more of such animated image(s) can include data (e.g., a link, and/or the like) configured to cause an application executed by computing device(s) 30, 40, and/or 50 (e.g., a web browser, an application associated with the subject, source, and/or the like of the advertisement, advertisement content, and/or the like) to present, navigate to, and/or the like content associated with the advertisement, advertisement content, and/or the like.

Additionally or alternatively, one or more of the plurality of different animated images associated with the context(s) can include one or more animated images that do not include advertisement content. For example, the data received from computing device 40 (e.g., at (230), and/or the like) can comprise data (e.g., the data indicating the one or more of the search term(s), and/or the like) indicating a context of computing device 40 corresponding at least in part to one or more contexts (e.g., study, and/or the like) different and distinct from the context(s) in which to present the advertisement content; and, based at least in part on the data received from computing device 40 (e.g., at (230), and/or the like), the record(s) regarding the corpus of animated images, and/or the like, computing system 112 can identify one or more animated images (e.g., animated image 328, and/or the like) determined by computing system 112 to be associated with such different and distinct context(s), and/or the like for inclusion in the plurality of different animated images associated with the context(s) for presentation by the dynamic keyboard interface in association with the application associated with portion 312 (e.g., animated images relevant, responsive, and/or the like to the context(s)).

Figure 3K:
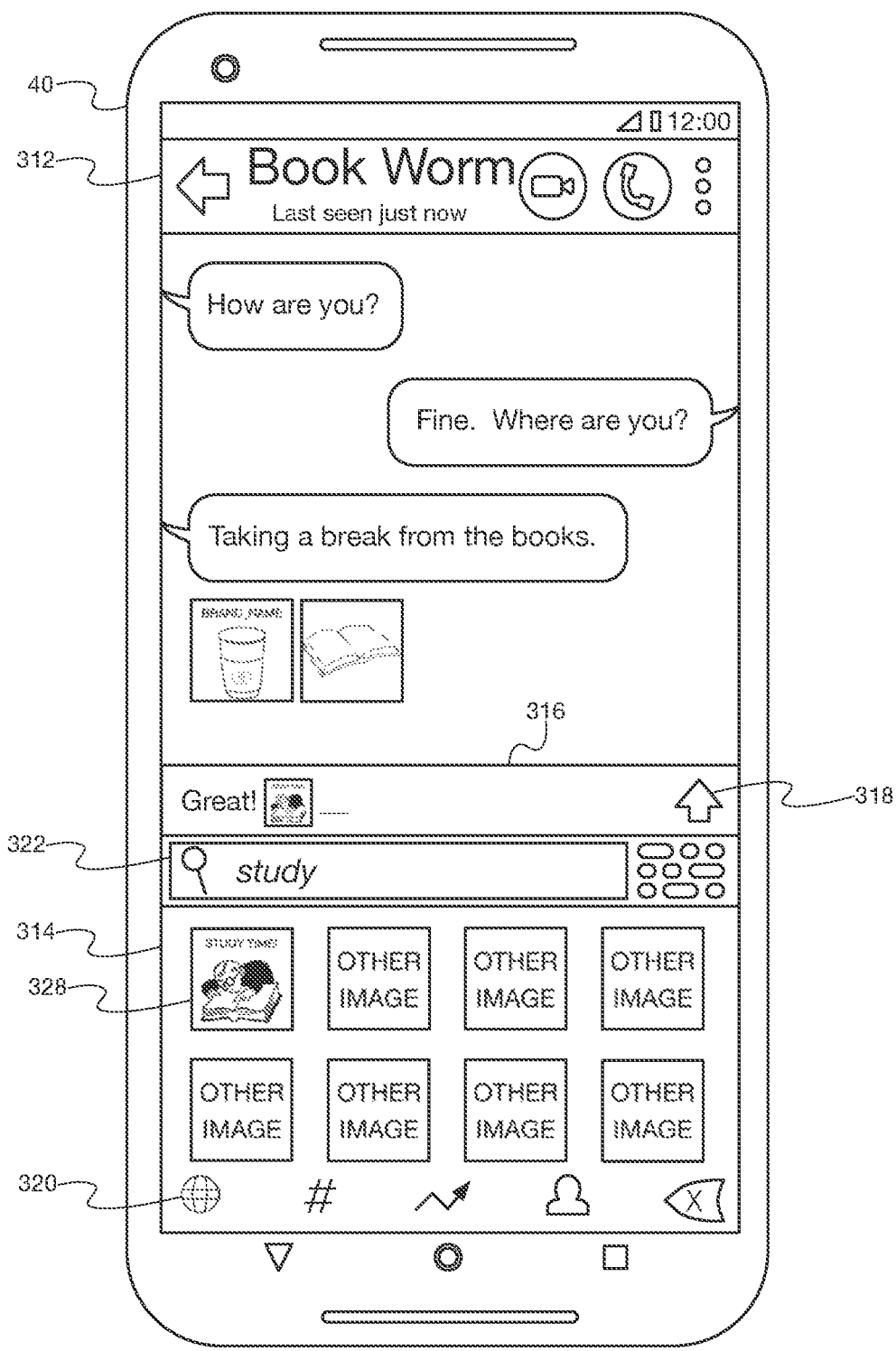
Figure 3L:
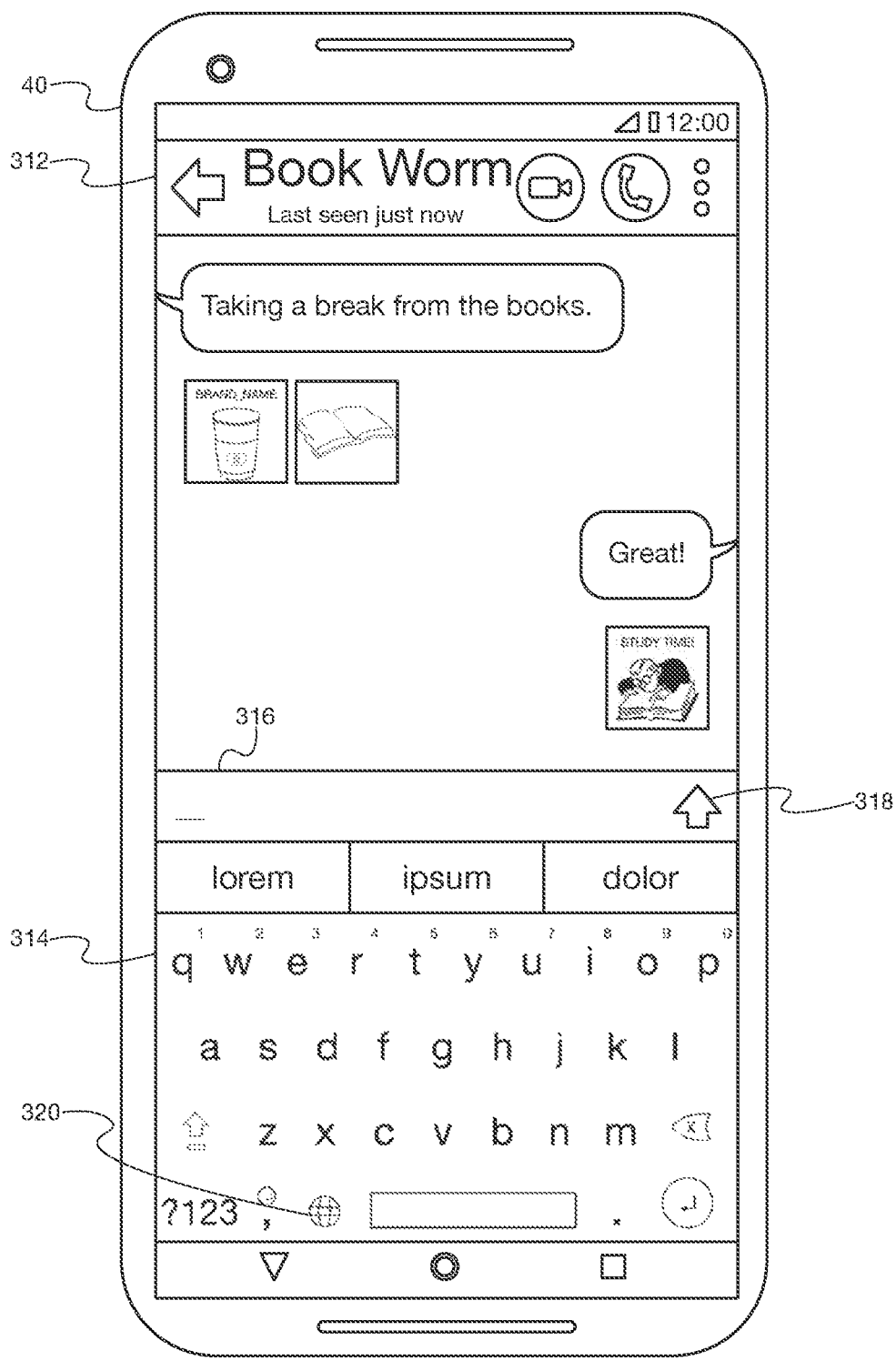

At (236), a user can select one or more particular animated images from amongst the plurality of different animated images associated with the context(s) via the dynamic keyboard interface. In some embodiments, the user can select one or more of the particular animated image(s) for communication (e.g., input, pasting, and/or the like) by the dynamic keyboard interface to the application associated with portion 312. Additionally or alternatively, the user can select one or more of the particular animated image(s) for future accessibility within the dynamic keyboard interface (e.g., designate such particular animated image(s) for frequent use, "favorite" them, and/or the like). For example, referring to FIG. 3K, the user can select animated image 328 for communication by the dynamic keyboard interface to the application associated with portion 312, and/or the like, and, referring to FIG. 3L, responsive to the user invoking element 318, and/or the like, the dynamic keyboard interface can communicate animated image 328 to the application associated with portion 312, and/or the like.

At (238), computing device 40 can generate data indicating the selection(s), selection type(s) (e.g., for communication to the application associated with portion 312, and/or the like), particular animated image(s) selected (e.g., animated image 328, and/or the like) and can communicate such data to computing system 112, which can receive the data and, at (240), can update the record(s) regarding the corpus of animated images based at least in part thereon.

Based at least in part on the data indicating the context(s) (e.g., received at (208), (222), (230), and/or the like), the data indicating the selection(s), selection type(s), particular animated image(s) selected, and/or the like (e.g., received at (216), (238), and/or the like), the record(s) regarding the corpus of animated images, and/or the like, at (242), computing system 112 can generate data describing an interface comprising a report regarding the advertisement content described by the data received from computing device 10 (e.g., at (202), and/or the like), and, at (244), computing system 112 can communicate such data to computing device 10, which can receive the data. For example, computing device 10 can be associated with an entity that is the subject of, creates, maintains, coordinates, manages, and/or the like such advertisement content, and/or the like. At (246), computing device 10 can generate data indicating feedback regarding the advertisement content generated via the interface comprising the report and can communicate such data to computing system 112, which can receive the data and update the record(s) regarding the corpus of animated images based at least in part thereon.

Based at least in part on the data indicating the context(s) (e.g., received at (208), (222), (230), and/or the like), the data indicating the selection(s), selection type(s), particular animated image(s) selected, and/or the like (e.g., received at (216), (238), and/or the like), the data indicating the feedback (e.g., received at (246), and/or the like), the record(s) regarding the corpus of animated images, and/or the like, at (248), computing system 112 can determine one or more additional contexts (e.g., books, study, and/or the like) for presenting the advertisement content described by the data received from computing device 10 (e.g., at (202), and/or the like). In some embodiments, determining the additional context(s) can include associating, based at least in part on the data indicating the context(s) in which to present such advertisement content (e.g., the geographic locations at which the particular brand of coffee is available, and/or the like) and the data (e.g., received at (208), (222), (230), and/or the like) indicating the context(s) (e.g., books, study, and/or the like), the different and distinct context(s) (e.g., books, study, and/or the like) with the context(s) in which to present the advertisement content (e.g., the geographic locations at which the particular brand of coffee is available, and/or the like).

Figure 2D:
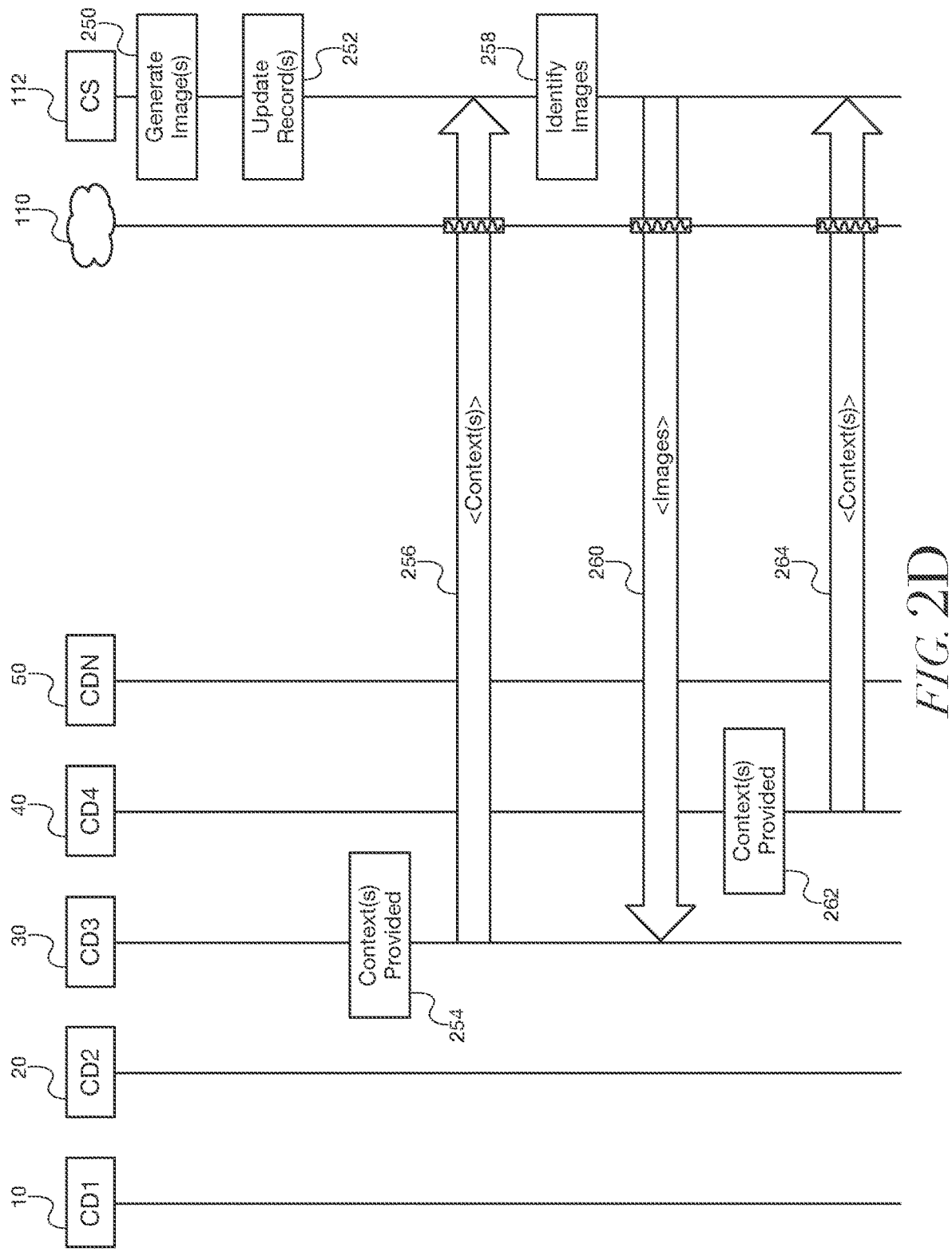
Figure 4D:
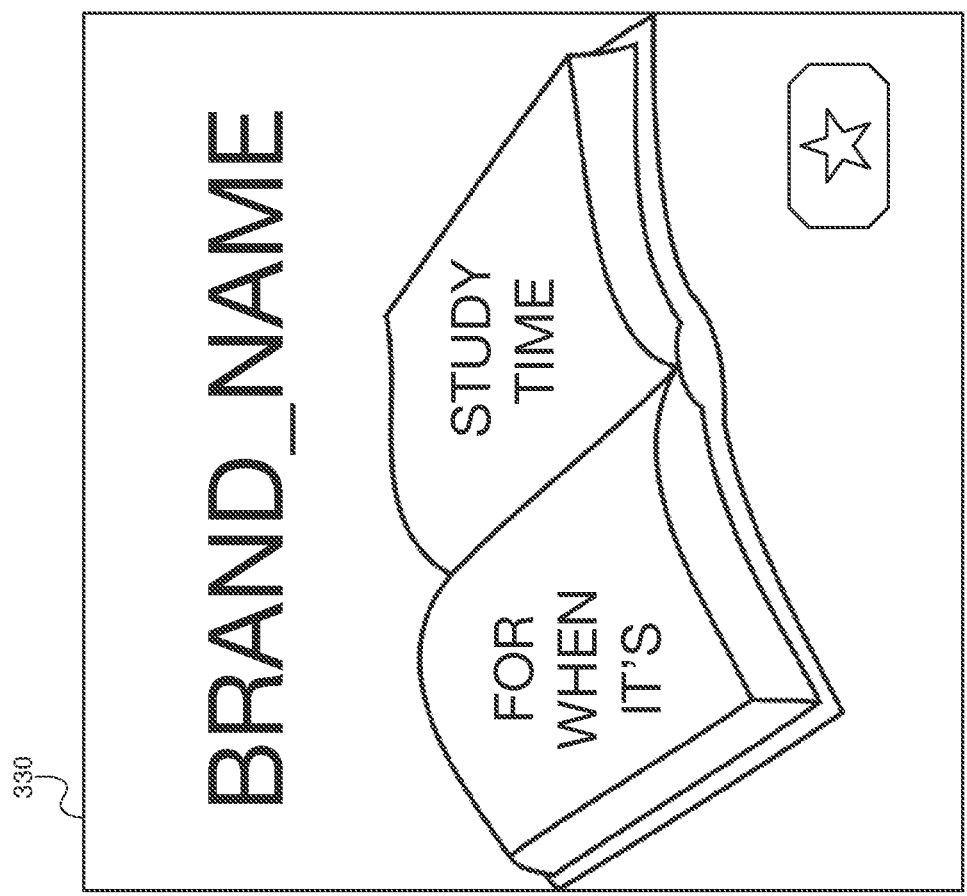
Figure 4E:
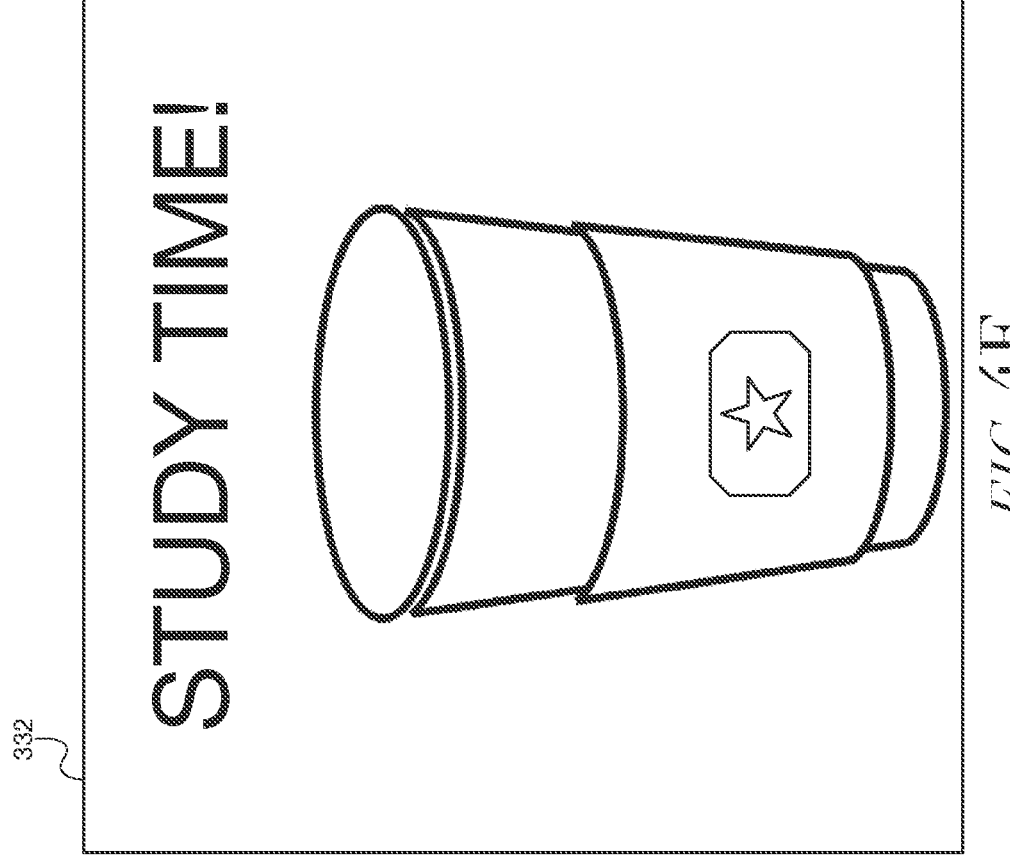
Figure 4F:
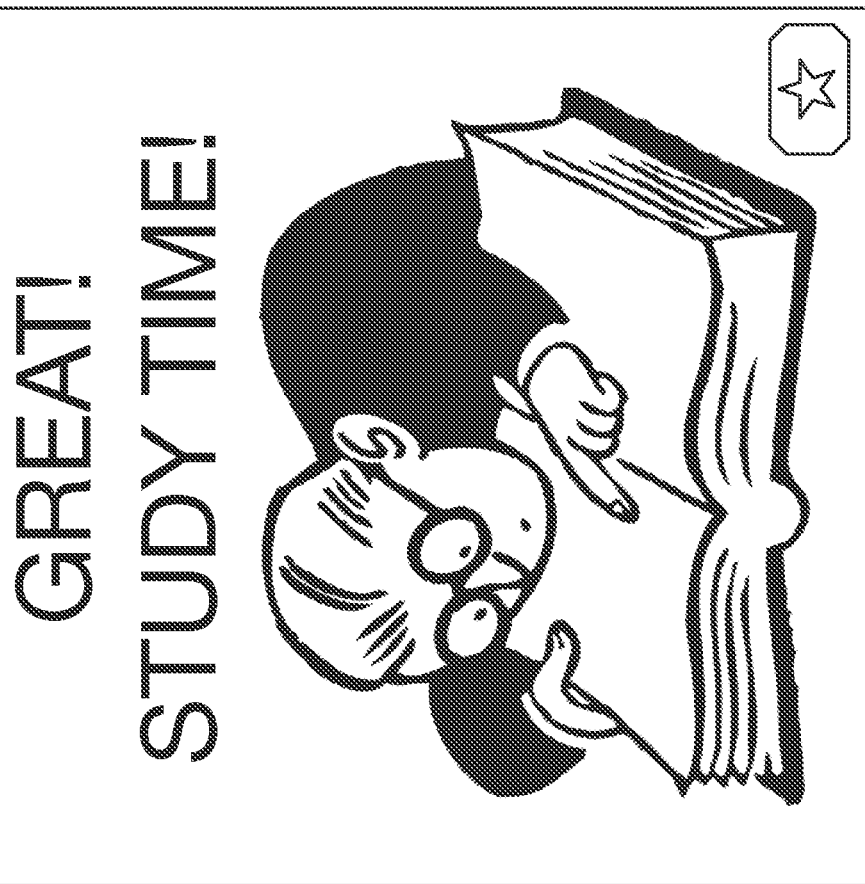

Referring to FIG. 2D, based at least in part on the data indicating the context(s) (e.g., received at (208), (222), (230), and/or the like), the data indicating the selection(s), selection type(s), particular animated image(s) selected, and/or the like (e.g., received at (216), (238), and/or the like), the data indicating the feedback (e.g., received at (246), and/or the like), the additional context(s) (e.g., books, study, and/or the like) for presenting the advertisement content, the data describing the advertisement content received from computing device 10 (e.g., at (202), and/or the like), the record(s) regarding the corpus of animated images, and/or the like, at (250), computing system 112 can generate data describing one or more new animated images, each of which can include one or more portions of the advertisement content, be visually distinguishable from the animated image(s) comprising the portion(s) of the advertisement content described by the data previously generated by computing system 112, and/or the like. For example, referring to FIGS. 4D-F, computing system 112 can generate data describing one or more of animated images 330, 332, 334, and/or the like.

In some embodiments, computing system 112 can utilize one or more machine learning (ML) models to determine one or more of the additional context(s) for presenting the advertisement content, generate one or more portions of the data describing the new animated image(s), and/or the like.

In some embodiments, generating the data describing the new animated image(s) can include identifying: imagery determined by computing system 112 to be associated with the additional context(s) (e.g., imagery included in animated image(s) 326, 328, and/or the like); imagery determined by computing system 112 to be associated with the advertisement content (e.g., imagery described by the data received from computing device 10 (e.g., at (202), and/or the like), included in animated image 324, and/or the like); and/or text determined by computing system 112 to be associated with the advertisement content (e.g., text described by the data received from computing device 10 (e.g., at (202), and/or the like), included in animated image 324, and/or the like).

In some embodiments, generating the data describing the new animated image(s) can include augmenting at least a portion of the imagery determined to be associated with the advertisement content (e.g., a background indicating a "BRAND_NAME" of the particular brand of coffee, a logo associated with the particular brand of coffee, a cup having such logo, and/or the like) with visible text (e.g., "GREAT!," "FOR WHEN IT'S," "STUDY TIME," and/or the like) determined by computing system 112 to be associated with one or more of the additional context(s), associate one or more of the new animated image(s) with one or more of the additional context(s), and/or the like.

In some of such embodiments, computing system 112 can utilize optical character recognition (OCR) to determine one or more characters (e.g., "STUDY TIME," and/or the like) included in the imagery determined to be associated with the additional context(s) (e.g., the imagery included in animated image 328, and/or the like), generate data describing the visible text based at least in part on such determined character(s), and/or the like. Additionally or alternatively, the data indicating the context(s) (e.g., received at (208), (222), (230), and/or the like) can indicate one or more search terms (e.g., "study," and/or the like), data presented by and/or input into one or more applications in association with which the dynamic keyboard interface was provided (e.g., "Great!," and/or the like), and computing system 112 can generate data describing the visible text based at least in part on such data, and/or the like.

In some embodiments, generating the data describing the new animated image(s) can include augmenting at least a portion of the imagery determined to be associated with the advertisement content (e.g., the background indicating the "BRAND_NAME" of the particular brand of coffee, the logo associated with the particular brand of coffee, the cup having such logo, and/or the like) with at least a portion of the imagery determined to be associated with the additional context(s) (e.g., the imagery included in animated image(s) 326, 328, and/or the like). In some of such embodiments, computing system 112 can determine the at least a portion of the imagery determined to be associated with the additional context(s) is associated with one or more of the additional context(s), associates one or more of the new animated image(s) with one or more of the additional context(s), and/or the like.

In some embodiments, generating the data describing the new animated image(s) can include augmenting at least a portion of the imagery determined to be associated with the additional context(s) (e.g., the imagery included in animated image(s) 326, 328, and/or the like) with at least a portion of the imagery determined to be associated with the advertisement content (e.g., the background indicating the "BRAND_ NAME" of the particular brand of coffee, the logo associated with the particular brand of coffee, the cup having such logo, and/or the like).

In some embodiments, generating the data describing the new animated image(s) can include augmenting at least a portion of the imagery determined to be associated with the additional context(s) (e.g., the imagery included in animated image(s) 326, 328, and/or the like) with at least a portion of the text determined to be associated with the advertisement content (e.g., "BRAND_NAME," and/or the like).

Returning to FIG. 2D, at (252), computing system 112 can update the record(s) regarding the corpus of animated images, for example, based at least in part on the data describing the new animated image(s) (e.g., animated image(s) 330, 332, 334, and/or the like), the additional context(s) (e.g., books, study, and/or the like) for presenting the advertisement content, and/or the like.

Figure 3M:
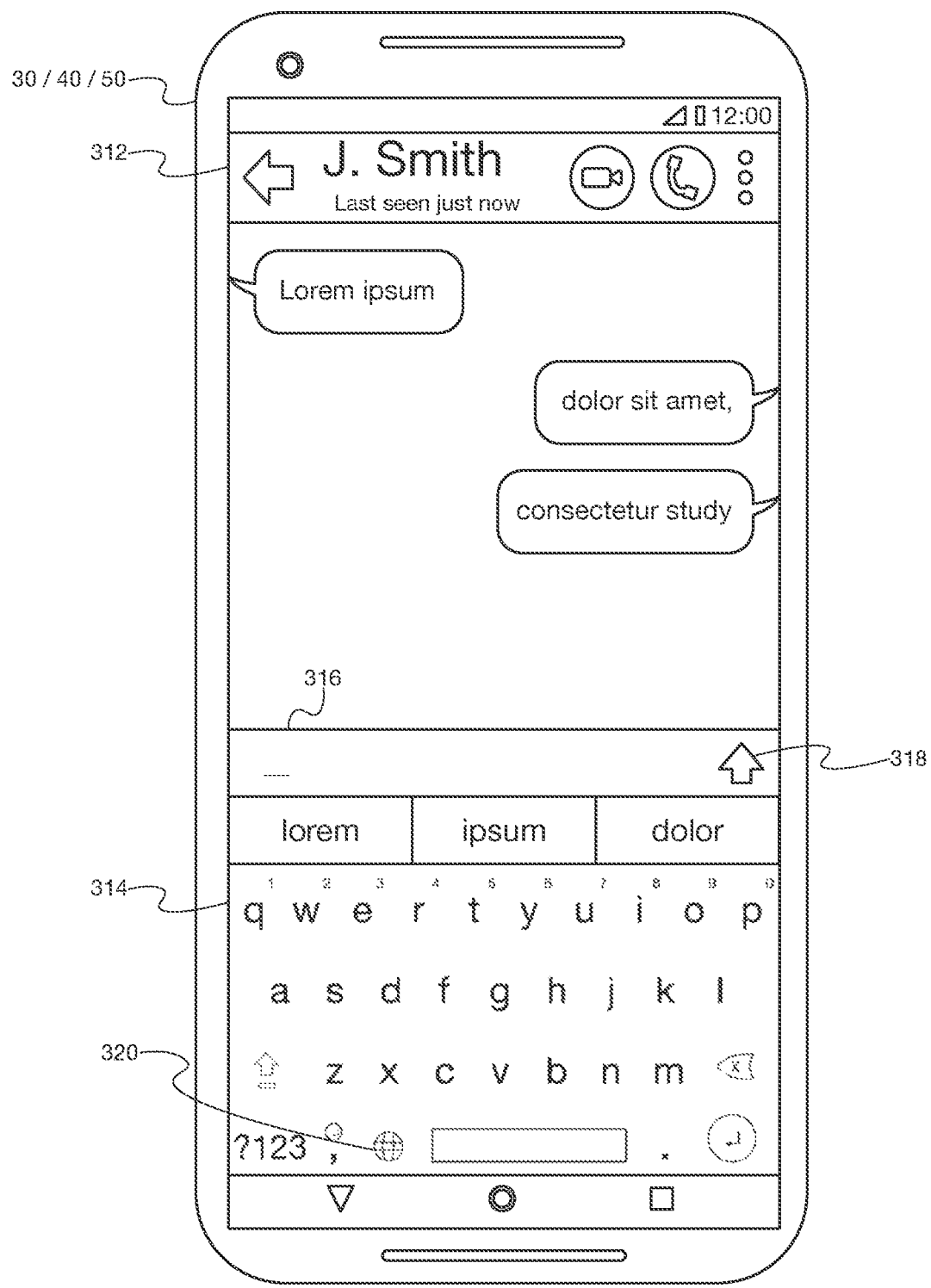

At (254), a user can perform one or more actions that provide one or more different and distinct contexts associated with computing device 30. The context(s) provided can be of computing device 30, the dynamic keyboard interface, the application associated with portion 312, and/or the like. For example, referring to FIG. 3M, the user can interact with the application associated with portion 312 via its interface, and/or the like. Additionally or alternatively, the context(s) provided can be of the application associated with element 304 (e.g., the email application, and/or the like), with which, referring to FIG. 3O, portion 336 can be associated, and/or the like. For example, the user can interact with the application associated with portion 336 via its interface, and/or the like.

At (256), computing device 30 (e.g., the dynamic keyboard interface, and/or the like) can generate data indicating such context(s) and can communicate such data to computing system 112, which can receive the data and update the record(s) regarding the corpus of animated images based at least in part thereon. In some embodiments, the data indicating the context(s) can indicate data presented by and/or input into the dynamic keyboard interface, the application associated with portion 312, the application associated with portion 336, and/or the like (e.g., "consectetur study," and/or the like). Additionally or alternatively, the data indicating the context(s) can indicate a current time, time of day, date, day of week, month, year, and/or the like; a size of an audience associated with computing device 30, the context of the application associated with portion 312, the context of the application associated with portion 336, and/or the like; a human-language setting associated with computing device 30; a geographic area to which computing device 30 is registered; a network identifier associated with computing device 30; a current geographic location of computing device 30; and/or the like.

Based at least in part on the data indicating the context(s), the record(s) regarding the corpus of animated images, and/or the like, at (258), computing system 112 can identify a plurality of different animated images associated with the context(s) for presentation by the dynamic keyboard interface in association with the application associated with portion 312, the application associated with portion 336, and/or the like (e.g., animated images relevant, responsive, and/or the like to the context(s)).

At (260), computing system 112 can generate data indicating the plurality of different animated images associated with the context(s) and can communicate such data to computing device 30 (e.g., to the dynamic keyboard interface), which can receive the data.

Figure 3N:
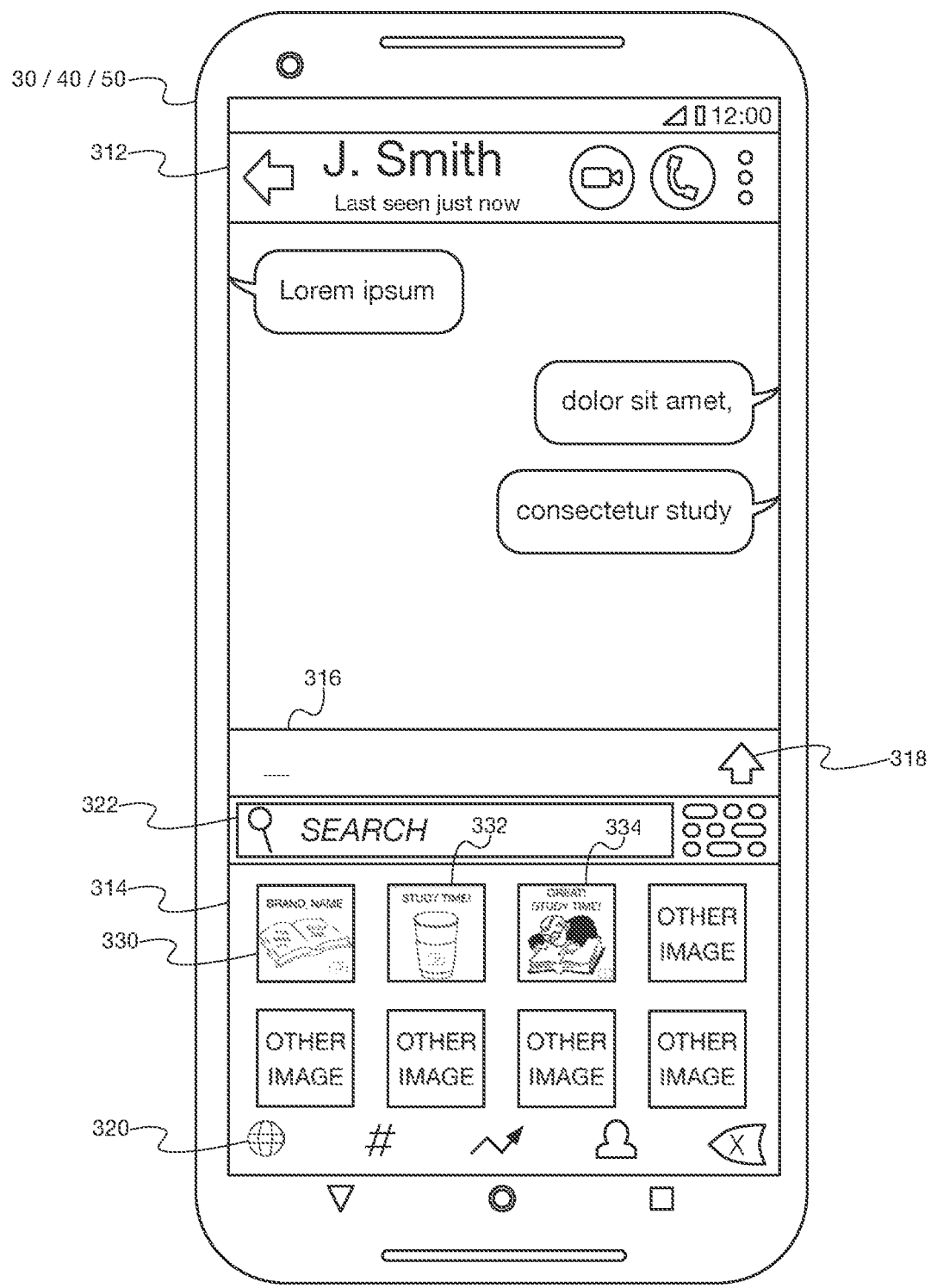
Figure 30:
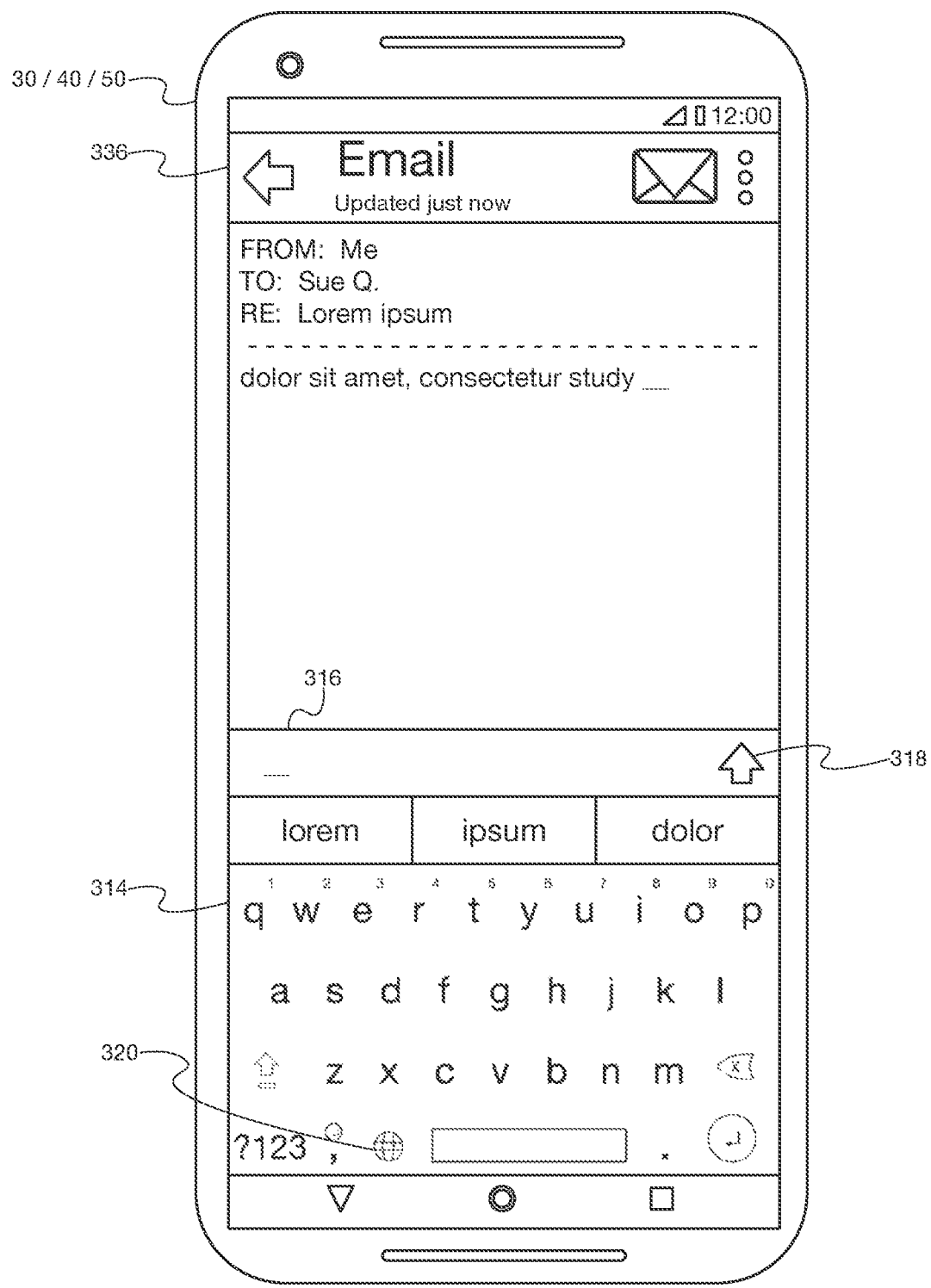
Figure 3P:
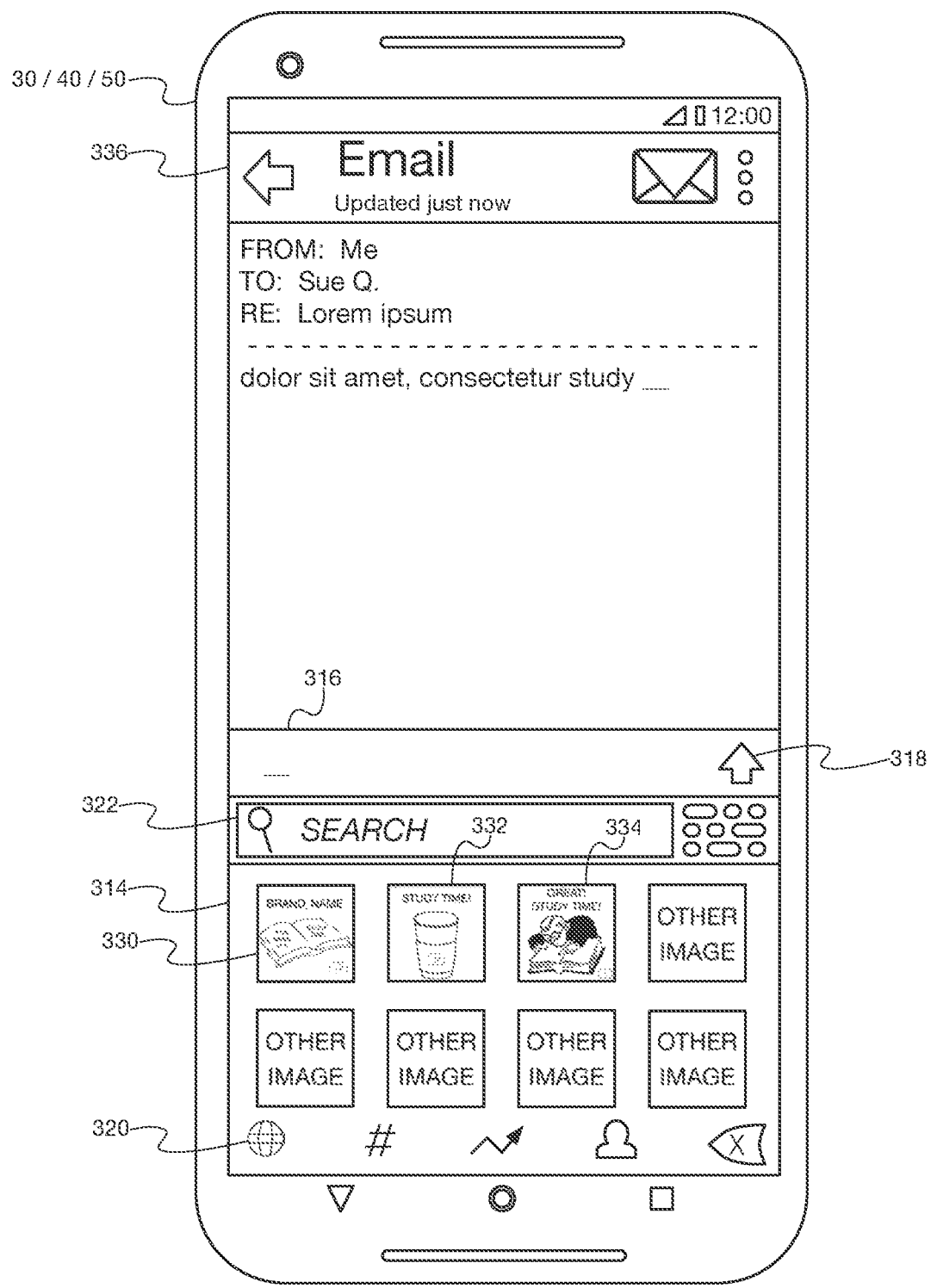

Referring to FIG. 3N and FIG. 3P, responsive to the user invoking element 320, and/or the like, the dynamic keyboard interface can toggle (e.g., from the qwerty keyboard, and/or the like) to the illustrated animated-image keyboard, and/or the like, which can present the plurality of different animated images associated with the context(s). For example, the plurality of different animated images associated with the context(s) can be presented in an ordered, sorted, and/or the like fashion (e.g., animated images determined to be more relevant, responsive, and/or the like to the context(s) can be presented earlier, more prominently, and/or the like).

As illustrated, multiple different animated images from the plurality of different animated images associated with the context(s) can be simultaneously displayed by the dynamic keyboard interface alongside one another. For example, the dynamic keyboard interface can simultaneously display animated images 330, 332, 334, and/or the like amongst others of the plurality of different animated images associated with the context(s) and/or the like. In some embodiments, one or more of the plurality of different animated images associated with the context(s) can include one or more of the new animated image(s) (e.g., animated image(s) 330, 332, 334, and/or the like). Additionally or alternatively, one or more of the plurality of different animated images associated with the context(s) can include one or more animated images that do not include advertisement content.

At (262), a user can perform one or more actions that provide one or more different and distinct contexts associated with computing device 40. The context(s) provided can be of computing device 40, the dynamic keyboard interface, the application associated with portion 312, the application associated with portion 336, and/or the like. For example, referring to FIG. 3M, the user can interact with the application associated with portion 312 via its interface, and/or the like. Additionally or alternatively, referring to FIG. 3O, the user can interact with the application associated with portion 336 via its interface, and/or the like.

At (264), computing device 40 (e.g., the dynamic keyboard interface, and/or the like) can generate data indicating such context(s) and can communicate such data to computing system 112, which can receive the data and update the record(s) regarding the corpus of animated images based at least in part thereon. In some embodiments, the data indicating the context(s) can indicate data presented by and/or input into the dynamic keyboard interface, the application associated with portion 312, the application associated with portion 336, and/or the like (e.g., "consectetur study," and/or the like). Additionally or alternatively, the data indicating the context(s) can indicate a current time, time of day, date, day of week, month, year, and/or the like; a size of an audience associated with computing device 40, the context of the application associated with portion 312, the context of the application associated with portion 336, and/or the like; a human-language setting associated with computing device 40; a geographic area to which computing device 40 is registered; a network identifier associated with computing device 40; a current geographic location of computing device 40; and/or the like.

Figure 2E:
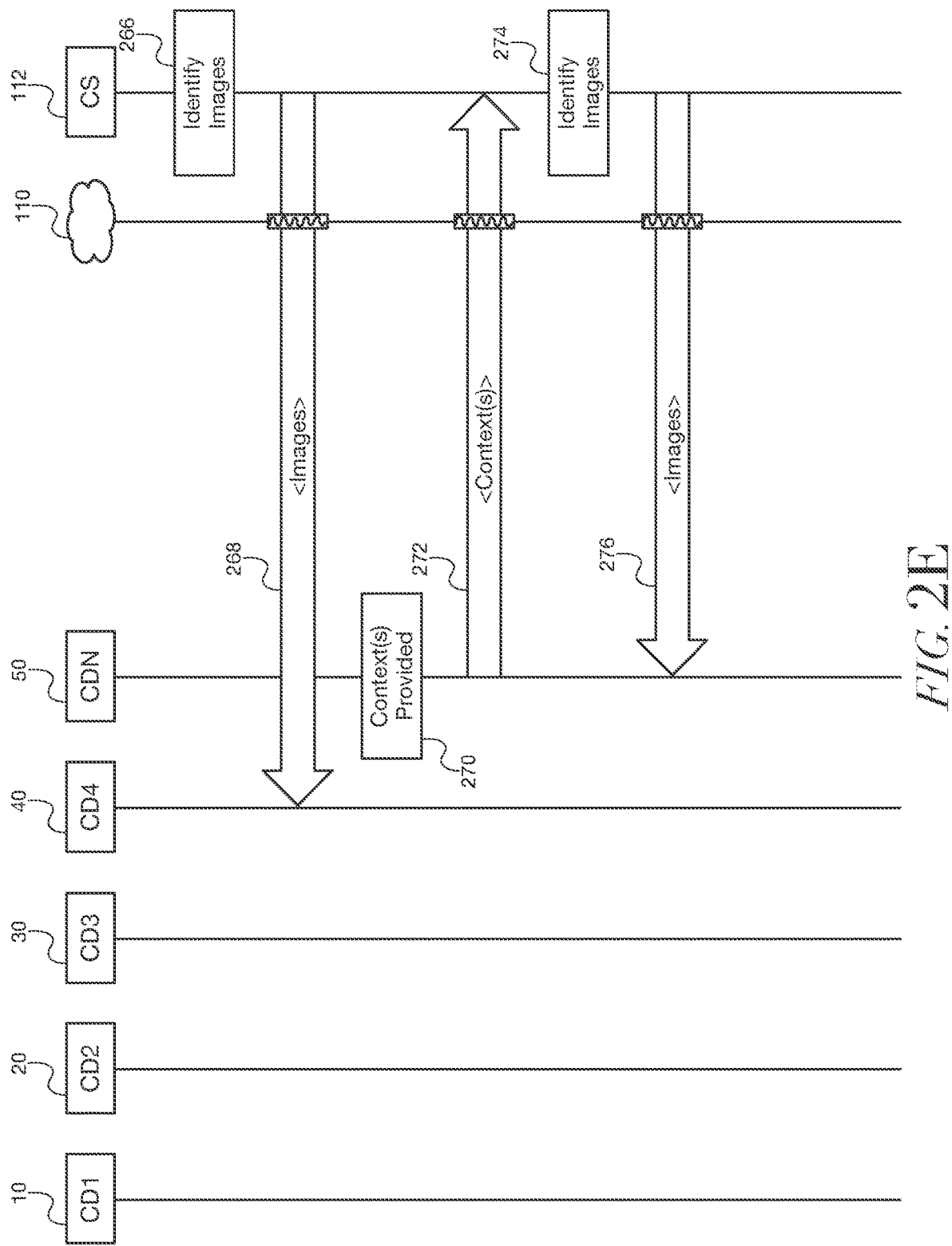

Referring to FIG. 2E, based at least in part on the data indicating the context(s), the record(s) regarding the corpus of animated images, and/or the like, at (266), computing system 112 can identify a plurality of different animated images associated with the context(s) for presentation by the dynamic keyboard interface in association with the application associated with portion 312, the application associated with portion 336, and/or the like (e.g., animated images relevant, responsive, and/or the like to the context(s)).

At (268), computing system 112 can generate data indicating the plurality of different animated images associated with the context(s) and can communicate such data to computing device 40 (e.g., to the dynamic keyboard interface), which can receive the data.

Referring to FIG. 3N and FIG. 3P, responsive to the user invoking element 320, and/or the like, the dynamic keyboard interface can toggle (e.g., from the qwerty keyboard, and/or the like) to the illustrated animated-image keyboard, and/or the like, which can present the plurality of different animated images associated with the context(s). For example, the plurality of different animated images associated with the context(s) can be presented in an ordered, sorted, and/or the like fashion (e.g., animated images determined to be more relevant, responsive, and/or the like to the context(s) can be presented earlier, more prominently, and/or the like).

As illustrated, multiple different animated images from the plurality of different animated images associated with the context(s) can be simultaneously displayed by the dynamic keyboard interface alongside one another. For example, the dynamic keyboard interface can simultaneously display animated images 330, 332, 334, and/or the like amongst others of the plurality of different animated images associated with the context(s) and/or the like. In some embodiments, one or more of the plurality of different animated images associated with the context(s) can include one or more of the new animated image(s) (e.g., animated image(s) 330, 332, 334, and/or the like). Additionally or alternatively, one or more of the plurality of different animated images associated with the context(s) can include one or more animated images that do not include advertisement content.

At (270), a user can perform one or more actions that provide one or more different and distinct contexts associated with computing device 50. The context(s) provided can be of computing device 50, the dynamic keyboard interface, the application associated with portion 312, the application associated with portion 336, and/or the like. For example, referring to FIG. 3M, the user can interact with the application associated with portion 312 via its interface, and/or the like. Additionally or alternatively, referring to FIG. 3O, the user can interact with the application associated with portion 336 via its interface, and/or the like.

At (272), computing device 50 (e.g., the dynamic keyboard interface, and/or the like) can generate data indicating such context(s) and can communicate such data to computing system 112, which can receive the data and update the record(s) regarding the corpus of animated images based at least in part thereon. In some embodiments, the data indicating the context(s) can indicate data presented by and/or input into the dynamic keyboard interface, the application associated with portion 312, the application associated with portion 336, and/or the like (e.g., "consectetur study," and/or the like). Additionally or alternatively, the data indicating the context(s) can indicate a current time, time of day, date, day of week, month, year, and/or the like; a size of an audience associated with computing device 50, the context of the application associated with portion 312, the context of the application associated with portion 336, and/or the like; a human-language setting associated with computing device 50; a geographic area to which computing device 50 is registered; a network identifier associated with computing device 50; a current geographic location of computing device 50; and/or the like.

Based at least in part on the data indicating the context(s), the record(s) regarding the corpus of animated images, and/or the like, at (274), computing system 112 can identify a plurality of different animated images associated with the context(s) for presentation by the dynamic keyboard interface in association with the application associated with portion 312, the application associated with portion 336, and/or the like (e.g., animated images relevant, responsive, and/or the like to the context(s)).

At (276), computing system 112 can generate data indicating the plurality of different animated images associated with the context(s) and can communicate such data to computing device 50 (e.g., to the dynamic keyboard interface), which can receive the data.

Referring to FIG. 3N and FIG. 3P, responsive to the user invoking element 320, and/or the like, the dynamic keyboard interface can toggle (e.g., from the qwerty keyboard, and/or the like) to the illustrated animated-image keyboard, and/or the like, which can present the plurality of different animated images associated with the context(s). For example, the plurality of different animated images associated with the context(s) can be presented in an ordered, sorted, and/or the like fashion (e.g., animated images determined to be more relevant, responsive, and/or the like to the context(s) can be presented earlier, more prominently, and/or the like).

As illustrated, multiple different animated images from the plurality of different animated images associated with the context(s) can be simultaneously displayed by the dynamic keyboard interface alongside one another. For example, the dynamic keyboard interface can simultaneously display animated images 330, 332, 334, and/or the like amongst others of the plurality of different animated images associated with the context(s) and/or the like. In some embodiments, one or more of the plurality of different animated images associated with the context(s) can include one or more of the new animated image(s) (e.g., animated image(s) 330, 332, 334, and/or the like). Additionally or alternatively, one or more of the plurality of different animated images associated with the context(s) can include one or more animated images that do not include advertisement content.

Figure 5:
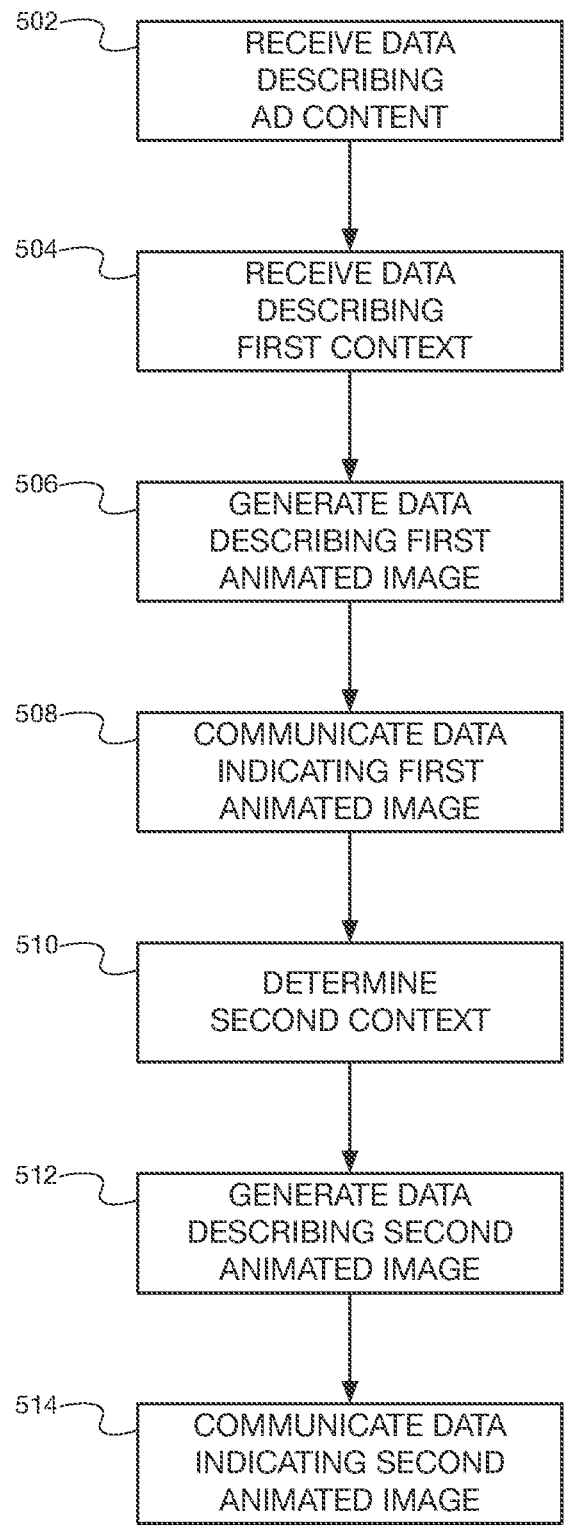
FIG. 5 depicts an example method according to example embodiments of the present disclosure.

FIG. 5 depicts an example method according to example embodiments of the present disclosure.

Referring to FIG. 5, at (502), one or more computing devices can receive data describing advertisement content. For example, computing system 112 can receive, from computing device 10, data describing advertisement content (e.g., for the particular brand of coffee, and/or the like).

At (504), the computing device(s) can receive data describing a first context in which to present the advertisement content. For example, computing system 112 can receive, from computing device 10, data describing one or more contexts (e.g., coffee generally, geographic locations at which the particular brand of coffee is available, and/or the like) in which to present the advertisement content.

At (506), the computing device(s) can generate data describing a first animated image including at least a portion of the advertisement content. For example, computing system 112 can generate data describing animated image 324, and/or the like.

At (508), the computing device(s) can communicate data indicating the first animated image. For example, computing system 112 can communicate, to computing device 30, data indicating animated image 324, and/or the like.

At (510), the computing device(s) can determine a second context in which to present the advertisement content. For example, computing system 112 can determine the additional context(s) (e.g., books, study, and/or the like) for presenting the advertisement content.

At (512), the computing device(s) can generate data describing a second animated image including at least a portion of the advertisement content. For example, computing system 112 can generate data describing animated image(s) 330, 332, 334, and/or the like.

At (514), the computing device(s) can communicate data indicating the second animated image. For example, computing system 112 can communicate, to computing device(s) 30, 40, 50, and/or the like, data indicating animated image(s) 330, 332, 334, and/or the like.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method comprising:
receiving, by one or more computing devices:
data describing advertisement content, and
data describing a first context in which to present the advertisement content;
generating, by the one or more computing devices and based at least in part on the data describing the advertisement content, data describing a first animated image including at least a portion of the advertisement content;
determining, by the one or more computing devices and based at least in part on the data describing the first context in which to present the advertisement content, a second context in which to present the advertisement content, the second context being different and distinct from the first context;
generating, by the one or more computing devices and based at least in part on the data describing the advertisement content and the second context in which to present the advertisement content, data describing a second animated image including at least a portion of the advertisement content, the second animated image being visually distinguishable from the first animated image; and communicating, by the one or more computing devices and to one or more user devices on which one or more applications are executed, data indicating a plurality of different animated images for presentation by a dynamic keyboard interface in association with the one or more applications, the plurality of different animated images comprising the first animated image and the second animated image.

2. The computer-implemented method of claim 1, wherein communicating the data indicating the plurality of different animated images comprises:

responsive to receiving, from a particular user device of the one or more user devices, data indicating the first context, communicating, to the particular user device, data indicating the first animated image for presentation by the dynamic keyboard interface in association with a particular application of the one or more applications; and responsive to receiving, from the particular user device, data indicating the second context, communicating, to the particular user device, data indicating the second animated image for presentation by the dynamic keyboard interface in association with the particular application.

3. The computer-implemented method of claim 1, wherein communicating the data indicating the plurality of different animated images comprises:

responsive to receiving, from a particular user device of the one or more user devices, data indicating the first context, communicating, to the particular user device, data indicating the first animated image for presentation by the dynamic keyboard interface in association with a first application of the one or more applications; and responsive to receiving, from the particular user device, data indicating the second context, communicating, to the particular user device, data indicating the second animated image for presentation by the dynamic keyboard interface in association with a second application of the one or more applications, the second application being different and distinct from the first application.

4. The computer-implemented method of claim 1, wherein communicating the data indicating the plurality of different animated images comprises:

responsive to receiving, from a first user device of the one or more user devices, data indicating the first context, communicating, to the first user device, data indicating the first animated image for presentation by the dynamic keyboard interface in association with a particular application of the one or more applications; and responsive to receiving, from a second user device of the one or more user devices, data indicating the second context, communicating, to the second user device, data indicating the second animated image for presentation by the dynamic keyboard interface in association with the particular application, the second user device being different and distinct from the first user device.

5. The computer-implemented method of claim 1, wherein communicating the data indicating the plurality of different animated images comprises:

responsive to receiving, from a first user device of the one or more user devices, data indicating the first context, communicating, to the first user device, data indicating the first animated image for presentation by the dynamic keyboard interface in association with a first application of the one or more applications; and responsive to receiving, from a second user device of the one or more user devices, data indicating the second context, communicating, to the second user device, data indicating the second animated image for presentation by the dynamic keyboard interface in association with a second application of the one or more applications, the second user device being different and distinct from the first user device, and the second application being different and distinct from the first application.

6. The computer-implemented method of claim 1, wherein:

the at least a portion of the advertisement content included in the second animated image comprises imagery determined, by the one or more computing devices, to be associated with the advertisement content; and generating the data describing the second animated image comprises augmenting at least a portion of the imagery determined to be associated with the advertisement content with visible text determined, by the one or more computing devices, to one or more of:
be associated with the second context, or
associate the second animated image with the second context.

7. The computer-implemented method of claim 6, wherein generating the data describing the second animated image comprises:

identifying imagery determined, by the one or more computing devices, to be associated with a context different and distinct from the first context;

utilizing optical character recognition (OCR) to determine one or more characters included in the imagery determined to be associated with the context different and distinct from the first context; and generating, based at least in part on the one or more characters, data describing the visible text.

8. The computer-implemented method of claim 6, wherein:

the method comprises, responsive to receiving data indicating a context different and distinct from the first context, identifying, by the one or more computing devices, imagery determined, by the one or more computing devices, to be associated with the context different and distinct from the first context; and generating the data describing the second animated image comprises generating, based at least in part on one or more search terms indicated by the data indicating the context different and distinct from the first context, the data describing the visible text.

9. The computer-implemented method of claim 1, wherein:

the at least a portion of the advertisement content included in the second animated image comprises imagery determined, by the one or more computing devices, to be associated with the advertisement content; and generating the data describing the second animated image comprises identifying imagery determined, by the one or more computing devices, to be associated with a context different and distinct from the first context.

10. The computer-implemented method of claim 9, wherein generating the data describing the second animated image comprises augmenting at least a portion of the imagery determined to be associated with the advertisement content with at least a portion of the imagery determined to be associated with the context different and distinct from the first context.

11. The computer-implemented method of claim 10, wherein the method comprises determining, by the one or more computing devices, that the at least a portion of the imagery determined to be associated with the context different and distinct from the first context one or more of:
is associated with the second context, or
associates the second animated image with the second context.

12. The computer-implemented method of claim 9, wherein generating the data describing the second animated image comprises augmenting at least a portion of the imagery determined to be associated with the context different and distinct from the first context with at least a portion of the imagery determined to be associated with the advertisement content.

13. The computer-implemented method of claim 1, wherein:
the at least a portion of the advertisement content included in the second animated image comprises text determined, by the one or more computing devices, to be associated with the advertisement content; and
generating the data describing the second animated image comprises:
identifying imagery determined, by the one or more computing devices, to be associated with a context different and distinct from the first context, and
augmenting at least a portion of the imagery determined to be associated with the context different and distinct from the first context with visible text comprising at least a portion of the text determined to be associated with the advertisement content.

14. The computer-implemented method of claim 1, wherein:
the method comprises:
responsive to receiving data indicating the first context in which to present the advertisement content, identifying, by the one or more computing devices, imagery determined, by the one or more computing devices, to be associated with the first context, and
responsive to receiving data indicating a context different and distinct from the first context, identifying, by the one or more computing devices, imagery determined, by the one or more computing devices, to be associated with the context different and distinct from the first context; and
determining the second context in which to present the advertisement content comprises associating, based at least in part on the data indicating the first context and the data indicating the context different and distinct from the first context, the context different and distinct from the first context with the first context.

15. The computer-implemented method of claim 14, wherein:
receiving the data indicating the first context comprises receiving, by the one or more computing devices and from a particular user device, the data indicating the first context; and
receiving the data indicating the context different and distinct from the first context comprises receiving, by the one or more computing devices and from the particular user device, the data indicating the context different and distinct from the first context.

16. The computer-implemented method of claim 14, wherein:
receiving the data indicating the first context comprises receiving, by the one or more computing devices and from a first user device, the data indicating the first context; and
receiving the data indicating the context different and distinct from the first context comprises receiving, by the one or more computing devices and from a second user device, the data indicating the context different and distinct from the first context, the second user device being different and distinct from the first user device.

17. The computer-implemented method of claim 1, comprising utilizing, by the one or more computing devices, one or more machine learning (ML) models to one or more of:
determine the second context in which to present the advertisement content; or
generate at least a portion of the data describing the second animated image.

18. The computer-implemented method of claim 1, comprising:
generating, by the one or more computing devices, data describing an interface comprising a report regarding the advertisement content;
receiving, by the one or more computing devices, data indicating feedback regarding the advertisement content generated via the interface comprising the report; and
utilizing, by the one or more computing devices, at least a portion of the data indicating the feedback regarding the advertisement content to one or more of:
determine the second context in which to present the advertisement content, or
generate at least a portion of the data describing the second animated image.

19. A system comprising:
one or more processors; and
a memory storing instructions that when executed by the one or more processors cause the system to perform operations comprising:
receiving data indicating a selection, from amongst a plurality of different animated images presented, by a dynamic keyboard interface, in association with a first context for presenting advertisement content, of a first animated image comprising at least a portion of the advertisement content;
receiving data indicating a selection, from amongst a plurality of different animated images presented, by the dynamic keyboard interface, in association with a context different and distinct from the first context, of an animated image that does not comprise the advertisement content;
determining, based at least in part on the data indicating the selection of the first animated image comprising the at least a portion of the advertisement content and the data indicating the selection of the animated image that does not comprise the advertisement content, a second context for presenting the advertisement content, the second context being different and distinct from the first context; and
generating, based at least in part on the second context for presenting the advertisement content and data describing the advertisement content, a second animated image comprising at least a portion of the advertisement content, the second animated image being visually distinguishable from the first animated image.

20. One or more non-transitory computer-readable media comprising instructions that when executed by one or more computing devices cause the one or more computing devices to perform operations comprising:

receiving data describing advertisement content;

receiving data indicating a selection, from amongst a plurality of different animated images presented, by a dynamic keyboard interface, in association with a first context for presenting the advertisement content, of a first animated image comprising at least a portion of the advertisement content; and generating, based at least in part on the data describing the advertisement content and data indicating a context different and distinct from the first context for presenting the advertisement content, a second animated image comprising at least a portion of the advertisement content for presentation by the dynamic keyboard interface in association with a second context for presenting the advertisement content determined by the one or more computing devices based at least in part on the data indicating the selection of the first animated image and the data indicating the context different and distinct from the first context, the second context being different and distinct from the first context, and the second animated image being visually distinguishable from the first animated image.

* * * * *